US012574905B2

(12) United States Patent
Zhu et al.

(10) Patent No.: US 12,574,905 B2
(45) Date of Patent: Mar. 10, 2026

(54) CHANNEL ADJUSTMENT METHOD AND ELECTRONIC DEVICE

(71) Applicant: Nokia Technologies OY, Espoo (FI)

(72) Inventors: Chong Zhu, Xi'an (CN); Qihu Zhang, Wuhan (CN)

(73) Assignee: Nokia Technologies Oy, Espo (FI)

( * ) Notice: Subject to any disclaimer, the term of this patent is extended or adjusted under 35 U.S.C. 154(b) by 413 days.

(21) Appl. No.: 18/007,279

(22) PCT Filed: Mar. 3, 2021

(86) PCT No.: PCT/CN2021/078935
§ 371 (c)(1),
(2) Date: Jan. 27, 2023

(87) PCT Pub. No.: WO2022/021878
PCT Pub. Date: Feb. 3, 2022

(65) Prior Publication Data
US 2023/0269707 A1     Aug. 24, 2023

(30) Foreign Application Priority Data

Jul. 28, 2020     (CN) .......................... 202010740592.6

(51) Int. Cl.
*H04W 72/044*     (2023.01)
*H04W 72/53*     (2023.01)
*H04W 84/12*     (2009.01)

(52) U.S. Cl.
CPC ......... *H04W 72/044* (2013.01); *H04W 72/53* (2023.01); *H04W 84/12* (2013.01)

(58) Field of Classification Search
CPC .............. H04W 72/044; H04W 72/53; H04W 72/0453; H04W 72/40; H04W 84/12;
(Continued)

(56) References Cited

U.S. PATENT DOCUMENTS

2013/0322416 A1*  12/2013  Son ........................ H04W 76/15
                                                        370/338
2015/0257129 A1*   9/2015  Yoon ..................... H04W 72/02
                                                        370/312
(Continued)

FOREIGN PATENT DOCUMENTS

CN          104468675 A       3/2015
CN          109640310 A       4/2019
(Continued)

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE 802.11.2016, Total 3534 pages, Internet Engineering Task Force, Reston, Virginia (Dec. 7, 2016).

*Primary Examiner* — Ricardo H Castaneyra
(74) *Attorney, Agent, or Firm* — Harness, Dickey & Pierce, P.L.C.

(57)          ABSTRACT
An electronic device includes one Wi-Fi chip and a first antenna and a second antenna connected to the Wi-Fi chip. The first antenna wirelessly communicates with another electronic device in a Wi-Fi P2P manner through a first channel. The second antenna wirelessly communicates with a first wireless signal source in a Wi-Fi AP manner through a second channel. After it is detected that the first channel and the second channel are two different channels on a same frequency band and time division multiplexing is performed on the first antenna and the second antenna, and a second wireless signal source whose frequency band is different from a frequency band of the first wireless signal source is detected within preset duration, the second channel is adjusted and the second antenna wirelessly communicates
(Continued)

(a)     (b)

with the second wireless signal source in the Wi-Fi AP manner through the adjusted second channel.

6 Claims, 20 Drawing Sheets

(58) Field of Classification Search
CPC ..... H04W 76/14; H04W 76/15; H04W 76/23; H04W 76/36; H04W 88/06
USPC .............. 370/330, 280, 235, 252, 310, 329; 455/450
See application file for complete search history.

(56) References Cited

U.S. PATENT DOCUMENTS

| | | |
|---|---|---|
| 2018/0249111 A1 | 8/2018 | Kim et al. |
| 2020/0120453 A1 | 4/2020 | Kim et al. |

FOREIGN PATENT DOCUMENTS

| | | |
|---|---|---|
| JP | 2020108121 A | 7/2020 |
| JP | 2020108123 A | 7/2020 |

* cited by examiner

Mobile device 100

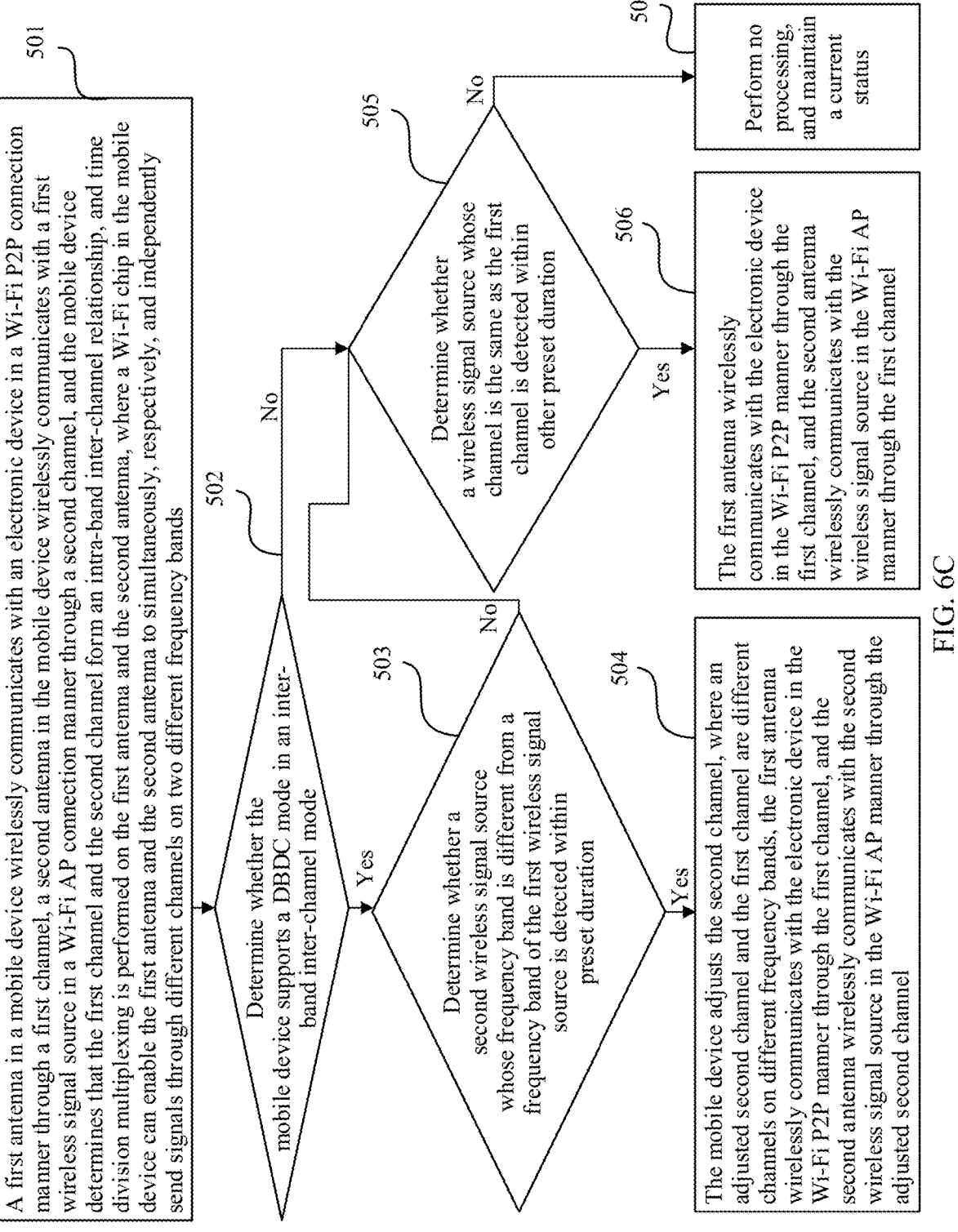

501

A first antenna in a mobile device wirelessly communicates with an electronic device in a Wi-Fi P2P connection manner through a first channel, a second antenna in the mobile device wirelessly communicates with a first wireless signal source in a Wi-Fi AP connection manner through a second channel, and the mobile device determines that the first channel and the second channel form an intra-band inter-channel relationship, and time division multiplexing is performed on the first antenna and the second antenna, where a Wi-Fi chip in the mobile device can enable the first antenna and the second antenna to simultaneously, respectively, and independently send signals through different channels on two different frequency bands

502

Determine whether the mobile device supports a DBDC mode in an inter-band inter-channel mode No

503

Determine whether a second wireless signal source whose frequency band is different from a frequency band of the first wireless signal source is detected within preset duration Yes

504

The mobile device adjusts the second channel, where an adjusted second channel and the first channel are different channels on different frequency bands, the first antenna wirelessly communicates with the electronic device in the Wi-Fi P2P manner through the first channel, and the second antenna wirelessly communicates with the second wireless signal source in the Wi-Fi AP manner through the adjusted second channel

505

Determine whether a wireless signal source whose channel is the same as the first channel is detected within other preset duration No

507

Perform no processing, and maintain a current status

506

Yes

The first antenna wirelessly communicates with the electronic device in the Wi-Fi P2P manner through the first channel, and the second antenna wirelessly communicates with the wireless signal source in the Wi-Fi AP manner through the first channel

FIG. 6C

A first antenna in a mobile device wirelessly communicates with an electronic device in a Wi-Fi P2P connection manner through a first channel, a second antenna in the mobile device wirelessly communicates with a first wireless signal source in a Wi-Fi AP connection manner through a second channel, and the mobile device determines that the first channel and the second channel form an intra-band inter-channel relationship, and time division multiplexing is performed on the first antenna and the second antenna, where a Wi-Fi chip in the mobile device can enable the first antenna and the second antenna to simultaneously, respectively, and independently send signals through different channels on two different frequency bands

501

Determine whether the mobile device supports a DBDC mode in an inter-band inter-channel mode

502

No

Yes

The mobile device sends a request message to the electronic device through the first channel, and receives a response message returned by the electronic device for the request message, where the request message includes a first channel to be obtained through adjustment

503'

Determine whether the response message is a positive response message

504'

Yes

No

Determine whether a second wireless signal source whose frequency band is different from a frequency band of the first wireless signal source is detected within preset duration

503

No

Yes

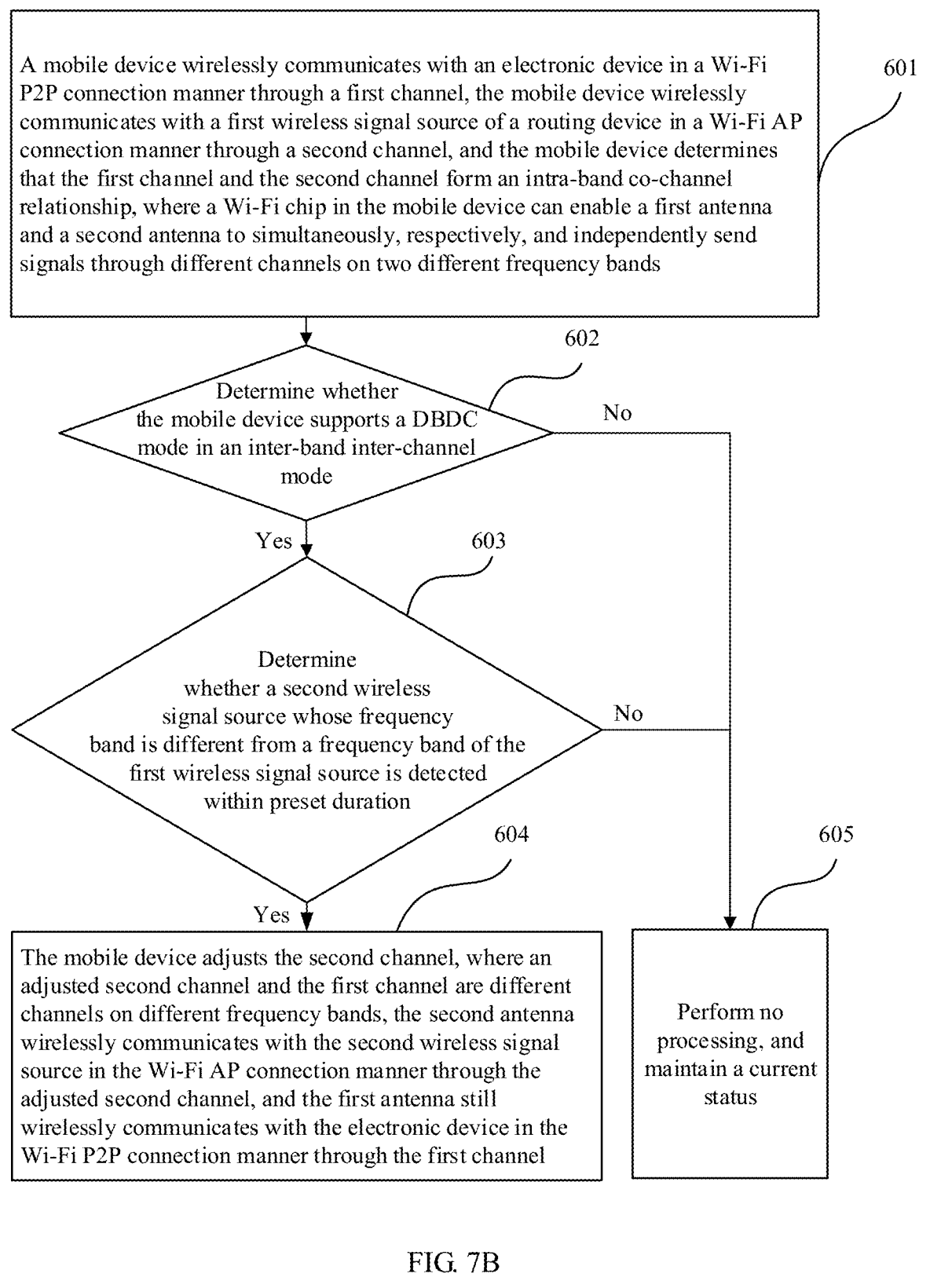

A mobile device wirelessly communicates with an electronic device in a Wi-Fi P2P connection manner through a first channel, the mobile device wirelessly communicates with a first wireless signal source of a routing device in a Wi-Fi AP connection manner through a second channel, and the mobile device determines that the first channel and the second channel form an intra-band co-channel relationship, where a Wi-Fi chip in the mobile device can enable a first antenna and a second antenna to simultaneously, respectively, and independently send signals through different channels on two different frequency bands    601

Determine whether the mobile device supports a DBDC mode in an inter-band inter-channel mode    602    No Yes    603

Determine whether a second wireless signal source whose frequency band is different from a frequency band of the first wireless signal source is detected within preset duration    No 604    605

Yes

The mobile device adjusts the second channel, where an adjusted second channel and the first channel are different channels on different frequency bands, the second antenna wirelessly communicates with the second wireless signal source in the Wi-Fi AP connection manner through the adjusted second channel, and the first antenna still wirelessly communicates with the electronic device in the Wi-Fi P2P connection manner through the first channel Perform no processing, and maintain a current status

FIG. 7B

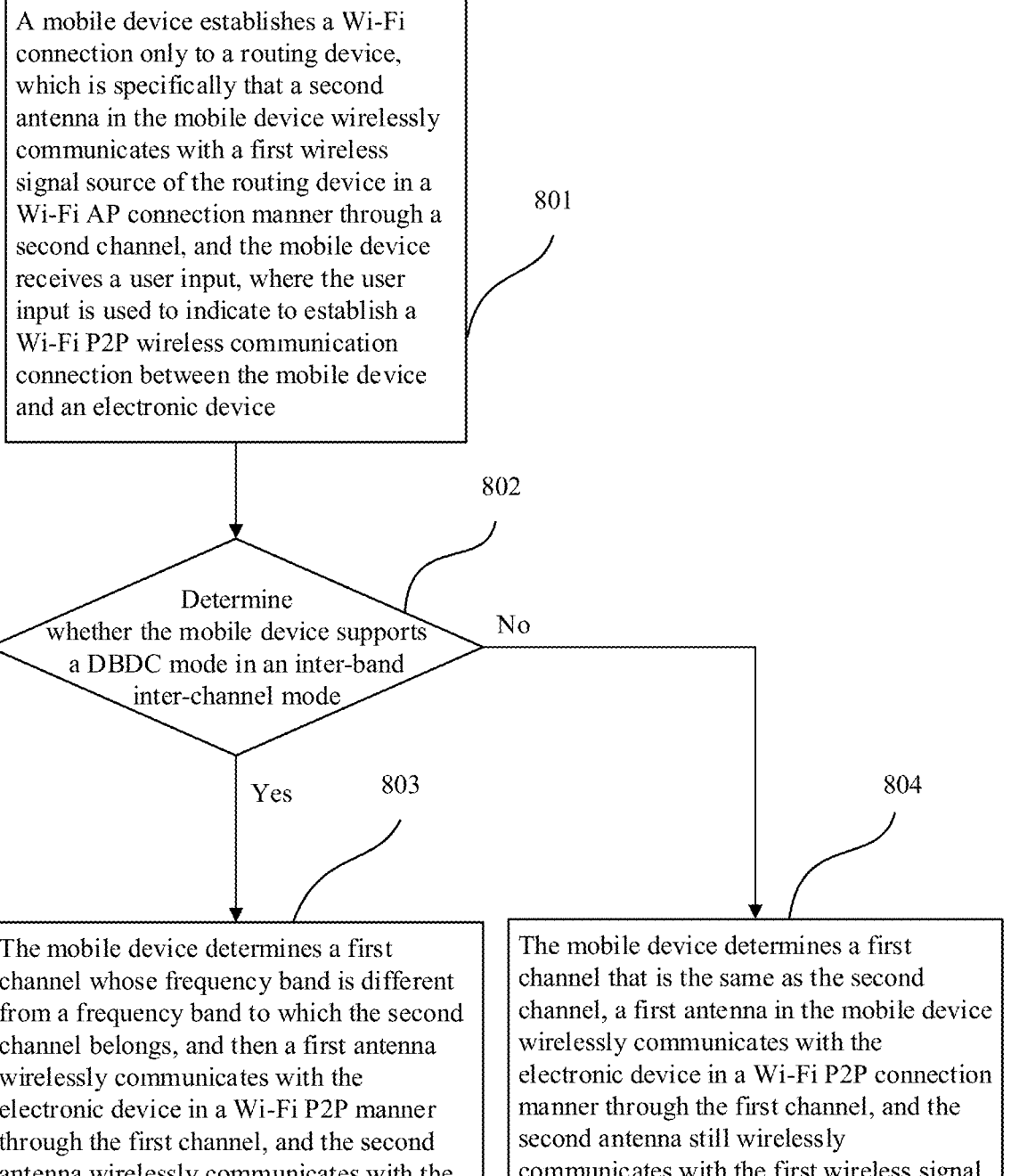

A mobile device establishes a Wi-Fi connection only to a routing device, which is specifically that a second antenna in the mobile device wirelessly communicates with a first wireless signal source of the routing device in a Wi-Fi AP connection manner through a second channel, and the mobile device receives a user input, where the user input is used to indicate to establish a Wi-Fi P2P wireless communication connection between the mobile device and an electronic device          801

Determine whether the mobile device supports a DBDC mode in an inter-band inter-channel mode          802          No Yes          803

The mobile device determines a first channel whose frequency band is different from a frequency band to which the second channel belongs, and then a first antenna wirelessly communicates with the electronic device in a Wi-Fi P2P manner through the first channel, and the second antenna wirelessly communicates with the first wireless signal source in the Wi-Fi AP manner through the second channel

804

The mobile device determines a first channel that is the same as the second channel, a first antenna in the mobile device wirelessly communicates with the electronic device in a Wi-Fi P2P connection manner through the first channel, and the second antenna still wirelessly communicates with the first wireless signal source in the Wi-Fi AP connection manner through the second channel

FIG. 8C

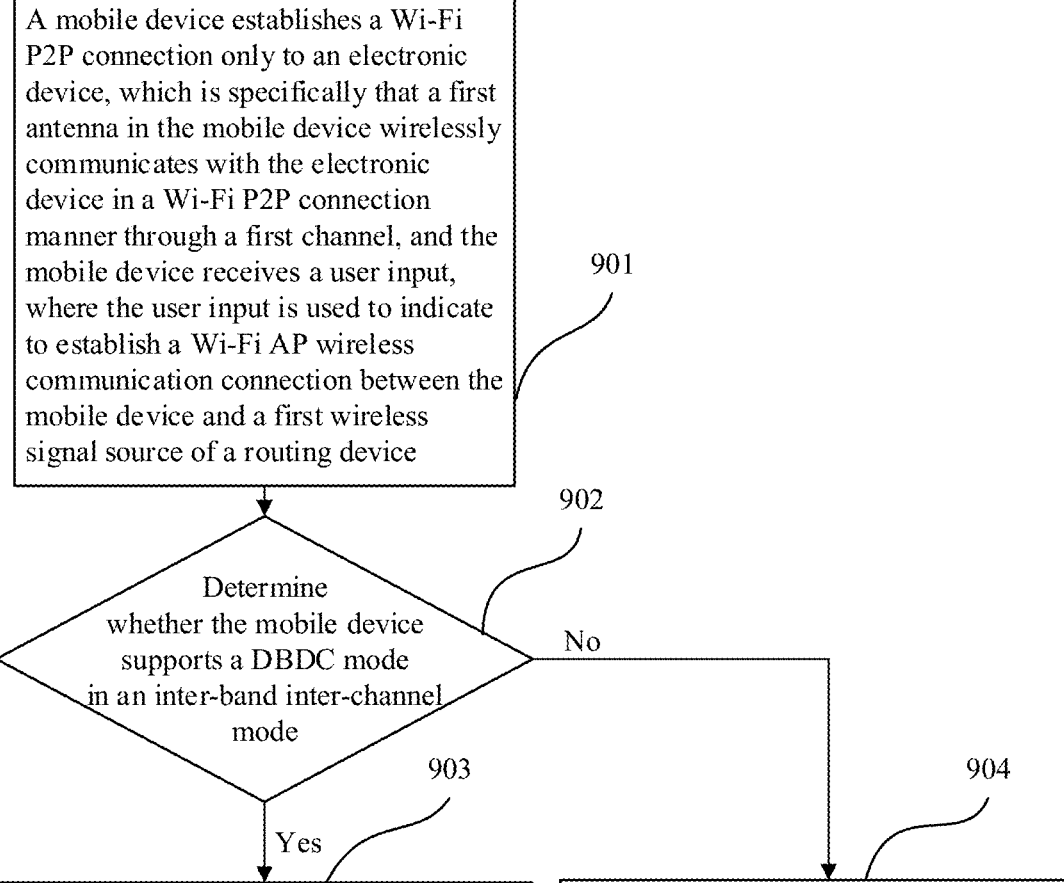

A mobile device establishes a Wi-Fi P2P connection only to an electronic device, which is specifically that a first antenna in the mobile device wirelessly communicates with the electronic device in a Wi-Fi P2P connection manner through a first channel, and the mobile device receives a user input, where the user input is used to indicate to establish a Wi-Fi AP wireless communication connection between the mobile device and a first wireless signal source of a routing device

901

Determine whether the mobile device supports a DBDC mode in an inter-band inter-channel mode

902

No

903

Yes

The mobile device determines a second channel whose frequency band is different from a frequency band to which the first channel belongs, and then the first antenna still wirelessly communicates with the electronic device in the Wi-Fi P2P manner through the first channel, and a second antenna wirelessly communicates with the first wireless signal source in a Wi-Fi AP manner through the second channel

904

The mobile device determines a second channel that is the same as the first channel, the first antenna in the mobile device wirelessly communicates with the electronic device in the Wi-Fi P2P connection manner through the first channel, and a second antenna wirelessly communicates with the first wireless signal source in a Wi-Fi AP connection manner through the second channel

FIG. 9C

CHANNEL ADJUSTMENT METHOD AND ELECTRONIC DEVICE

CROSS-REFERENCE TO RELATED APPLICATIONS

This application is a National Stage of International Application No. PCT/CN2021/078935 filed on Mar. 3, 2021, which claims priority to Chinese Patent Application No. 202010740592.6 filed on Jul. 28, 2020. Both of the aforementioned applications are hereby incorporated by reference in their entireties.

TECHNICAL FIELD

This disclosure relates to the field of terminal technologies, and in particular, to a channel adjustment method and an electronic device.

BACKGROUND

To perform Wi-Fi communication, an electronic device needs to be provided with a Wi-Fi chip in addition to an antenna. For a multi-antenna electronic device in which all of a plurality of antennas are connected to a same Wi-Fi chip, when a user simultaneously performs, by using the multi-antenna electronic device, two different operations, for example, internet access and screen projection, related to a wireless communications channel, two channels, for example, an internet access channel and a screen projection channel, of the multi-antenna electronic device may form an intra-band inter-channel relationship. In this case, the same connected Wi-Fi chip performs time division-based switching between the plurality of antennas in the multi-antenna electronic device, to implement time division-based switching between the channels. Consequently, there are extra overheads for the electronic device, and speeds of the two different operations, for example, speeds of internet access and screen projection, are sometimes high and sometimes low, resulting in relatively poor user experience.

SUMMARY

To resolve the foregoing technical problem, this disclosure provides a channel adjustment method and an electronic device, so that when a user simultaneously performs, by using an electronic device, two different operations, for example, internet access and screen projection, related to a channel, speeds of the two different operations are stable, and the two different operations are relatively fluent, to improve user experience.

According to a first aspect, an electronic device is provided. The electronic device includes: one or more processors: one or more memories: one Wi-Fi chip: N antennas, where all of the N antennas are connected to the Wi-Fi chip, the N antennas include a first antenna and a second antenna. N is a positive integer greater than or equal to 2, the first antenna wirelessly communicates with another electronic device in a Wi-Fi peer-to-peer (P2P) manner through a first channel, the second antenna wirelessly communicates with a first wireless signal source in a Wi-Fi access point (AP) manner through a second channel, and the Wi-Fi chip enables the first antenna and the second antenna to simultaneously, respectively, and independently send signals through different channels on two different frequency bands; and one or more computer programs, where the one or more computer programs are stored in the one or more memories, and when the computer program is executed by the one or more processors, the following steps are performed: after it is detected that the first channel and the second channel are two different channels on a same frequency band and time division multiplexing is performed on the first antenna and the second antenna, and a second wireless signal source whose frequency band is different from a frequency band of the first wireless signal source is detected within preset duration, the second channel is adjusted, where an adjusted second channel and the first channel are different channels on different frequency bands, the first antenna wirelessly communicates with the another electronic device in the Wi-Fi P2P manner through the first channel, and the second antenna wirelessly communicates with the second wireless signal source in the Wi-Fi AP manner through the adjusted second channel. The second channel is adjusted while the first channel is kept unchanged. In this way, the Wi-Fi chip does not need to perform switching, communication on the first channel and communication on the second channel are performed in parallel, quality of each channel is relatively good, there is a relatively low packet loss rate and a relatively low delay, interference between the first channel and the second channel is greatly reduced, the electronic device concurrently executes a service related to the first channel and a service related to the second channel, for example, independently and concurrently executes screen projection and internet access, and the two services have relatively high fluency. Therefore, there is relatively good user experience.

According to the first aspect, the following steps are further performed: after it is detected that the first channel and the second channel are two different channels on a same frequency band, but the second wireless signal source whose frequency band is different from the frequency band of the first wireless signal source is not detected within the preset duration, the first antenna wirelessly communicates with the another electronic device in the Wi-Fi P2P manner through the first channel, and the second antenna wirelessly communicates with the first wireless signal source in the Wi-Fi AP manner through the first channel. In this way, although the electronic device supports a dual band dual concurrent (DBDC) mode in an inter-band inter-channel mode, a wireless signal source whose frequency band is different from a frequency band to which the first channel belongs is not detected, and therefore a relationship between the first channel and the second channel is adjusted to a relationship of an intra-band co-channel mode.

According to any one of the first aspect or the implementation of the first aspect, the following steps are further performed: after it is detected that the first channel and the second channel are two different channels on a same frequency band, but the second wireless signal source whose frequency band is different from the frequency band of the first wireless signal source is not detected within the preset duration, and a wireless signal source whose channel is the same as the first channel is detected within other preset duration, the first antenna wirelessly communicates with the another electronic device in the Wi-Fi P2P manner through the first channel, and the second antenna wirelessly communicates with the wireless signal source in the Wi-Fi AP manner through the first channel. In this way, although the electronic device supports a DBDC mode in an inter-band inter-channel mode, a wireless signal source whose frequency band is different from a frequency band to which the first channel belongs is not detected, and therefore after a wireless signal source that provides a channel that is the same as the first channel is detected, a relationship between the first channel and the second channel is adjusted to a relationship of an intra-band co-channel mode.

According to any one of the first aspect or the implementations of the first aspect, the following steps are further performed: after it is detected that the first channel and the second channel are two different channels on a same frequency band, but the second wireless signal source whose frequency band is different from the frequency band of the first wireless signal source is not detected within the preset duration, and the wireless signal source whose channel is the same as the first channel is not detected within the other preset duration, the electronic device skips processing. In this way, although the electronic device supports a DBDC mode in an inter-band inter-channel mode, a wireless signal source whose frequency band is different from a frequency band to which the first channel belongs is not detected, and a wireless signal source that provides a channel that is the same as the first channel is not detected, and therefore no processing is performed, and a current status is maintained.

According to any one of the first aspect or the implementations of the first aspect, the following steps are further performed: after it is detected that the first channel and the second channel are a same channel on a same frequency band, and the second wireless signal source whose frequency band is different from the frequency band of the first wireless signal source is detected within the preset duration, the second channel is adjusted, where an adjusted second channel and the first channel are different channels on different frequency bands, the first antenna wirelessly communicates with the another electronic device in the Wi-Fi P2P manner through the first channel, and the second antenna wirelessly communicates with the second wireless signal source in the Wi-Fi AP manner through the adjusted second channel. In this way, the Wi-Fi chip does not need to perform switching, communication on the first channel and communication on the second channel are performed in parallel, quality of each channel is relatively good, there is a relatively low packet loss rate and a relatively low delay, interference between the first channel and the second channel is greatly reduced, the electronic device concurrently executes a service related to the first channel and a service related to the second channel, for example, independently and concurrently executes screen projection and internet access, and the two services have relatively high fluency. Therefore, there is relatively good user experience.

According to a second aspect, an electronic device is provided. The electronic device includes: one or more processors: one or more memories: one Wi-Fi chip: N antennas, where all of the N antennas are connected to the Wi-Fi chip, the N antennas include a first antenna and a second antenna. N is a positive integer greater than or equal to 2, the first antenna wirelessly communicates with another electronic device in a Wi-Fi P2P manner through a first channel, the second antenna wirelessly communicates with a first wireless signal source in a Wi-Fi AP manner through a second channel, and the Wi-Fi chip enables the first antenna and the second antenna to simultaneously, respectively, and independently send signals through different channels on two different frequency bands; and one or more computer programs, where the one or more computer programs are stored in the memory, and when the computer program is executed by the one or more processors, the following steps are performed: after it is detected that the first channel and the second channel are two different channels on a same frequency band, and time division multiplexing is performed on the first antenna and the second antenna, the first antenna sends a request message to the another electronic device through the first channel, where the request message includes a first channel to be obtained through adjustment, the first channel to be obtained through adjustment and the second channel are different channels on different frequency bands, and the request message is used to request to wirelessly communicate with the another electronic device in the Wi-Fi P2P manner through the first channel to be obtained through adjustment; and after a positive response message is received from the another electronic device, the first channel is adjusted to the first channel to be obtained through adjustment, the first antenna wirelessly communicates with the another electronic device in the Wi-Fi P2P manner through the adjusted first channel, and the second antenna wirelessly communicates with the first wireless signal source in the Wi-Fi AP manner through the second channel, where the positive response message is used to indicate that the another electronic device agrees to wirelessly communicate with the electronic device in the Wi-Fi P2P manner through the first channel to be obtained through adjustment. The first channel is adjusted while the second channel is kept unchanged. In a process of adjusting the first channel, when a consensus is reached between the two electronic devices, a relationship between the second channel and the first channel is adjusted to a relationship of a DBDC mode in an inter-band inter-channel mode. In this way, the Wi-Fi chip does not need to perform switching, communication on the first channel and communication on the second channel are performed in parallel, quality of each channel is relatively good, there is a relatively low packet loss rate and a relatively low delay, interference between the first channel and the second channel is greatly reduced, the electronic device concurrently executes a service related to the first channel and a service related to the second channel, for example, independently and concurrently executes screen projection and internet access, and the two services have relatively high fluency. Therefore, there is relatively good user experience.

According to the second aspect, the following steps are further performed: after a negative response message is received from the another electronic device, and a second wireless signal source whose frequency band is different from a frequency band of the first wireless signal source is detected within preset duration, the second channel is adjusted, where an adjusted second channel and the first channel are different channels on different frequency bands, the first antenna wirelessly communicates with the another electronic device in the Wi-Fi P2P manner through the first channel, and the second antenna wirelessly communicates with the second wireless signal source in the Wi-Fi AP manner through the adjusted second channel, where the negative response message is used to indicate that the another electronic device does not agree to wirelessly communicate with the electronic device in the Wi-Fi P2P manner through the first channel to be obtained through adjustment. In a process of adjusting the first channel, when no consensus can be reached between the two electronic devices, adjustment of the first channel can only be abandoned in this case, and the second channel is adjusted, so that a relationship between the second channel and the first channel is adjusted to a relationship of a DBDC mode in an inter-band inter-channel mode. In this way, the Wi-Fi chip does not need to perform switching, communication on the first channel and communication on the second channel are performed in parallel, quality of each channel is relatively good, there is a relatively low packet loss rate and a relatively low delay, interference between the first channel and the second channel is greatly reduced, the electronic device concurrently executes a service related to the first channel and a service related to the second channel, for example, independently and concurrently executes screen projection and internet access, and the two services have relatively high fluency. Therefore, there is relatively good user experience.

According to any one of the second aspect or the implementations of the second aspect, the following steps are further performed: after the negative response message is received from the another electronic device, and the second wireless signal source whose frequency band is different from the frequency band of the first wireless signal source is not detected within the preset duration, the first antenna wirelessly communicates with the another electronic device in the Wi-Fi P2P manner through the first channel, and the second antenna wirelessly communicates with the first wireless signal source in the Wi-Fi AP manner through the first channel. In a process of adjusting the first channel, when no consensus can be reached between the two electronic devices, and the second channel is adjusted, if a wireless signal source whose frequency band is different from a frequency band to which the first channel belongs is not detected, a relationship between the first channel and the second channel is adjusted to a relationship of an intra-band co-channel mode.

According to any one of the second aspect or the implementations of the second aspect, the following steps are further performed: after the negative response message is received from the another electronic device, the second wireless signal source whose frequency band is different from the frequency band of the first wireless signal source is not detected within the preset duration, and a wireless signal source whose channel is the same as the first channel is detected within other preset duration, the first antenna wirelessly communicates with the another electronic device in the Wi-Fi P2P manner through the first channel, and the second antenna wirelessly communicates with the wireless signal source in the Wi-Fi AP manner through the first channel. In this way, in a process of adjusting the first channel, when no consensus can be reached between the two electronic devices, and the second channel is adjusted, if a wireless signal source whose frequency band is different from a frequency band to which the first channel belongs is not detected, but the wireless signal source whose channel is the same as the first channel is detected, a relationship between the first channel and the second channel is adjusted to a relationship of an intra-band co-channel mode.

According to any one of the second aspect or the implementations of the second aspect, the following steps are further performed: after the negative response message is received from the another electronic device, the second wireless signal source whose frequency band is different from the frequency band of the first wireless signal source is not detected within the preset duration, and the wireless signal source whose channel is the same as the first channel is not detected within the other preset duration, the electronic device skips processing. In this way, in a process of adjusting the first channel, when no consensus can be reached between the two electronic devices, and the second channel is adjusted, if a wireless signal source whose frequency band is different from a frequency band to which the first channel belongs is not detected, and the wireless signal source whose channel is the same as the first channel is not detected, the electronic device performs no processing, and maintains a current status.

According to any one of the second aspect or the implementations of the second aspect, the following steps are further performed: after it is detected that the first channel and the second channel are a same channel on a same frequency band and time division multiplexing is performed on the first antenna and the second antenna, and the second wireless signal source whose frequency band is different from the frequency band of the first wireless signal source is detected within the preset duration, the second channel is adjusted, where an adjusted second channel and the first channel are different channels on different frequency bands, the first antenna wirelessly communicates with the another electronic device in the Wi-Fi P2P manner through the first channel, and the second antenna wirelessly communicates with the second wireless signal source in the Wi-Fi AP manner through the adjusted second channel. In this way, the Wi-Fi chip does not need to perform switching, communication on the first channel and communication on the second channel are performed in parallel, quality of each channel is relatively good, there is a relatively low packet loss rate and a relatively low delay, interference between the first channel and the second channel is greatly reduced, the electronic device concurrently executes a service related to the first channel and a service related to the second channel, for example, independently and concurrently executes screen projection and internet access, and the two services have relatively high fluency. Therefore, there is relatively good user experience.

According to a third aspect, an electronic device is provided. The electronic device includes: one or more processors: one or more memories: one Wi-Fi chip: N antennas, where all of the N antennas are connected to the Wi-Fi chip, the N antennas include a first antenna and a second antenna. N is a positive integer greater than or equal to 2, the first antenna is in an idle state, the second antenna wirelessly communicates with a first wireless signal source in a Wi-Fi AP manner through a second channel, and the Wi-Fi chip enables the first antenna and the second antenna to simultaneously, respectively, and independently send signals through different channels on two different frequency bands; and one or more computer programs, where the one or more computer programs are stored in the memory, and when the computer program is executed by the one or more processors, the following steps are performed: an input is received; and in response to the input, the first antenna wirelessly communicates with another electronic device in a Wi-Fi P2P manner through a first channel, and the second antenna wirelessly communicates with the first wireless signal source in the Wi-Fi AP manner through the second channel, where the first channel and the second channel are different channels on different frequency bands: or the first antenna wirelessly communicates with another electronic device in a Wi-Fi P2P manner through the second channel, and the second antenna wirelessly communicates with the first wireless signal source in the Wi-Fi AP manner through the second channel, where the input is used to indicate the electronic device to wirelessly communicate with the another electronic device in the Wi-Fi P2P manner. For example, the input may be a user input, or may be an input message or an input instruction sent by the another electronic device or any other electronic device to the electronic device. When the electronic device establishes a Wi-Fi wireless communication connection channel only with the another electronic device, and further needs to establish a Wi-Fi wireless communication connection channel with the any other electronic device, the new channel to be established and the established channel form a relationship of a DBDC mode in an inter-band inter-channel mode. In this way, after the new channel is established, the Wi-Fi chip does not need to perform switching, communication on the first channel and communication on the second channel are performed in parallel, quality of each channel is relatively good, there is a relatively low packet loss rate and a relatively low delay, interference between the first channel and the second channel is greatly reduced, the electronic device concurrently executes a service related to the first channel and a service related to the second channel, for example, independently and concurrently executes screen projection and internet access, and the two services have relatively high fluency. Therefore, there is relatively good user experience.

According to a fourth aspect, an electronic device is provided. The electronic device includes: one or more processors: one or more memories: one Wi-Fi chip: N antennas, where all of the N antennas are connected to the Wi-Fi chip, the N antennas include a first antenna and a second antenna. N is a positive integer greater than or equal to 2, the first antenna wirelessly communicates with another electronic device in a Wi-Fi P2P manner through a first channel, the second antenna is in an idle state, and the Wi-Fi chip enables the first antenna and the second antenna to simultaneously, respectively, and independently send signals through different channels on two different frequency bands; and one or more computer programs, where the one or more computer programs are stored in the memory, and when the computer program is executed by the one or more processors, the following steps are performed: after an input is received, and a first wireless signal source whose frequency band is different from a frequency band to which the first channel belongs is detected within preset duration, the first antenna wirelessly communicates with the another electronic device in the Wi-Fi P2P manner through the first channel, and the second antenna wirelessly communicates with the first wireless signal source in a Wi-Fi AP manner through a second channel, where the first channel and the second channel are different channels on different frequency bands, and the input is used to indicate the electronic device to wirelessly communicate with the wireless signal source in the Wi-Fi AP manner. For example, the input may be a user input, or may be an input message or an input instruction sent by the another electronic device or any other electronic device to the electronic device. When the electronic device establishes a Wi-Fi wireless communication connection channel only with the another electronic device, and further needs to establish a Wi-Fi wireless communication connection channel with the any other electronic device, the new channel to be established and the established channel form a relationship of a DBDC mode in an inter-band inter-channel mode. In this way, after the new channel is established, the Wi-Fi chip does not need to perform switching, communication on the first channel and communication on the second channel are performed in parallel, quality of each channel is relatively good, there is a relatively low packet loss rate and a relatively low delay, interference between the first channel and the second channel is greatly reduced, the electronic device concurrently executes a service related to the first channel and a service related to the second channel, for example, independently and concurrently executes screen projection and internet access, and the two services have relatively high fluency. Therefore, there is relatively good user experience.

According to the fourth aspect, the following steps are further performed: after the input is received, and the first wireless signal source whose frequency band is different from the frequency band to which the first channel belongs is not detected within the preset duration, but a second wireless signal source whose frequency band is different from the frequency band to which the first channel belongs is detected within the preset duration, the first antenna wirelessly communicates with the another electronic device in the Wi-Fi P2P manner through the first channel, and the second antenna wirelessly communicates with the second wireless signal source in the Wi-Fi AP manner through the first channel. For example, the input may be a user input, or may be an input message or an input instruction sent by the another electronic device or any other electronic device to the electronic device. In this way, although the electronic device supports a DBDC mode in an inter-band inter-channel mode, the wireless signal source whose frequency band is different from the frequency band to which the first channel belongs is not detected, and therefore a relationship between the first channel and the second channel is adjusted to a relationship of an intra-band co-channel mode.

According to a fifth aspect, an electronic device is provided. The electronic device includes: one or more processors: one or more memories: one Wi-Fi chip: N antennas, where all of the N antennas are connected to the Wi-Fi chip, the N antennas include a first antenna and a second antenna. N is a positive integer greater than or equal to 2, the first antenna wirelessly communicates with another electronic device in a Wi-Fi P2P manner through a first channel, the second antenna wirelessly communicates with a first wireless signal source in a Wi-Fi AP manner through a second channel, and the Wi-Fi chip enables the first antenna and the second antenna to simultaneously, respectively, and independently send signals through different channels on two different frequency bands; and one or more computer programs, where the one or more computer programs are stored in the one or more memories, and when the computer program is executed by the one or more processors, the following steps are performed: after it is detected that the first channel and the second channel are two different channels on a same frequency band, and time division multiplexing is performed on the first antenna and the second antenna, or after it is detected that the first channel and the second channel are different channels on two different frequency bands, the first antenna wirelessly communicates with the another electronic device in the Wi-Fi P2P manner through the first channel, and the second antenna wirelessly communicates with the first wireless signal source in the Wi-Fi AP manner through the first channel: or after it is detected that the first channel and the second channel are two different channels on a same frequency band, and time division multiplexing is performed on the first antenna and the second antenna, or after it is detected that the first channel and the second channel are different channels on two different frequency bands, the first antenna wirelessly communicates with the another electronic device in the Wi-Fi P2P manner through the second channel, and the second antenna wirelessly communicates with the first wireless signal source in the Wi-Fi AP manner through the second channel. In some scenarios, the electronic device focuses more on a high throughput. In this case, a relationship between the first channel and the second channel is adjusted to a relationship of an intra-band co-channel mode.

According to a sixth aspect, a channel adjustment method is provided. The method is applied to an electronic device. The electronic device includes one or more processors, one or more memories, one Wi-Fi chip, and N antennas. All of the N antennas are connected to the Wi-Fi chip, the N antennas include a first antenna and a second antenna, and N is a positive integer greater than or equal to 2. The first antenna wirelessly communicates with another electronic device in a Wi-Fi P2P manner through a first channel. The second antenna wirelessly communicates with a first wireless signal source in a Wi-Fi access point AP manner through a second channel. The Wi-Fi chip enables the first antenna and the second antenna to simultaneously, respectively, and independently send signals through different channels on two different frequency bands. The method includes: After it is detected that the first channel and the second channel are two different channels on a same frequency band and time division multiplexing is performed on the first antenna and the second antenna, and a second wireless signal source whose frequency band is different from a frequency band of the first wireless signal source is detected within preset duration, the second channel is adjusted, where an adjusted second channel and the first channel are different channels on different frequency bands, the first antenna wirelessly communicates with the another electronic device in the Wi-Fi P2P manner through the first channel, and the second antenna wirelessly communicates with the second wireless signal source in the Wi-Fi AP manner through the adjusted second channel.

For any implementation of the sixth aspect, refer to any implementation of the first aspect. For technical effects corresponding to any one of the sixth aspect and implementations of the sixth aspect, refer to the technical effects corresponding to any one of the first aspect and the implementations of the first aspect. Details are not described herein.

According to a seventh aspect, a channel adjustment method is provided. The method is applied to an electronic device. The electronic device includes one or more processors, one or more memories, one Wi-Fi chip, and N antennas. All of the N antennas are connected to the Wi-Fi chip, the N antennas include a first antenna and a second antenna, and N is a positive integer greater than or equal to 2. The first antenna wirelessly communicates with another electronic device in a Wi-Fi P2P manner through a first channel. The second antenna wirelessly communicates with a first wireless signal source in a Wi-Fi AP manner through a second channel. The Wi-Fi chip enables the first antenna and the second antenna to simultaneously, respectively, and independently send signals through different channels on two different frequency bands. The method includes: After it is detected that the first channel and the second channel are two different channels on a same frequency band, and time division multiplexing is performed on the first antenna and the second antenna, the first antenna sends a request message to the another electronic device through the first channel, where the request message includes a first channel to be obtained through adjustment, the first channel to be obtained through adjustment and the second channel are different channels on different frequency bands, and the request message is used to request to wirelessly communicate with the another electronic device in the Wi-Fi P2P manner through the first channel to be obtained through adjustment; and after a positive response message is received from the another electronic device, the first channel is adjusted to the first channel to be obtained through adjustment, the first antenna wirelessly communicates with the another electronic device in the Wi-Fi P2P manner through the adjusted first channel, and the second antenna wirelessly communicates with the first wireless signal source in the Wi-Fi AP manner through the second channel, where the positive response message is used to indicate that the another electronic device agrees to wirelessly communicate with the electronic device in the Wi-Fi P2P manner through the first channel to be obtained through adjustment.

For any implementation of the seventh aspect, refer to any implementation of the second aspect. For technical effects corresponding to any one of the seventh aspect and implementations of the seventh aspect, refer to the technical effects corresponding to any one of the second aspect and the implementations of the second aspect. Details are not described herein.

According to an eighth aspect, a channel adjustment method is provided. The method is applied to an electronic device. The electronic device includes one or more processors, one or more memories, one Wi-Fi chip, and N antennas. All of the N antennas are connected to the Wi-Fi chip, the N antennas include a first antenna and a second antenna, and N is a positive integer greater than or equal to 2. The first antenna is in an idle state. The second antenna wirelessly communicates with a first wireless signal source in a Wi-Fi AP manner through a second channel. The Wi-Fi chip enables the first antenna and the second antenna to simultaneously, respectively, and independently send signals through different channels on two different frequency bands. The method includes: An input is received; and in response to the input, the first antenna wirelessly communicates with another electronic device in a Wi-Fi P2P manner through a first channel, and the second antenna wirelessly communicates with the first wireless signal source in the Wi-Fi AP manner through the second channel, where the first channel and the second channel are different channels on different frequency bands; or the first antenna wirelessly communicates with another electronic device in a Wi-Fi P2P manner through the second channel, and the second antenna wirelessly communicates with the first wireless signal source in the Wi-Fi AP manner through the second channel, where the input is used to indicate the electronic device to wirelessly communicate with the another electronic device in the Wi-Fi P2P manner.

For technical effects corresponding to the eighth aspect, refer to the technical effects corresponding to the third aspect. Details are not described herein.

According to a ninth aspect, a channel adjustment method is provided. The method is applied to an electronic device. The electronic device includes one or more processors, one or more memories, one Wi-Fi chip, and N antennas. All of the N antennas are connected to the Wi-Fi chip, the N antennas include a first antenna and a second antenna, and N is a positive integer greater than or equal to 2. The first antenna wirelessly communicates with another electronic device in a Wi-Fi P2P manner through a first channel. The second antenna is in an idle state. The Wi-Fi chip enables the first antenna and the second antenna to simultaneously, respectively, and independently send signals through different frequency bands. The method includes: After an input is received, and a first wireless signal source whose frequency band is different from a frequency band to which the first channel belongs is detected within preset duration, the first antenna wirelessly communicates with the another electronic device in the Wi-Fi P2P manner through the first channel, and the second antenna wirelessly communicates with the first wireless signal source in a Wi-Fi AP manner through a second channel, where the first channel and the second channel are different channels on different frequency bands, and the input is used to indicate the electronic device to wirelessly communicate with the wireless signal source in the Wi-Fi AP manner.

For any implementation of the ninth aspect, refer to any implementation of the fourth aspect. For technical effects corresponding to any one of the ninth aspect and implementations of the ninth aspect, refer to the technical effects corresponding to any one of the fourth aspect and the implementations of the fourth aspect. Details are not described herein.

According to a tenth aspect, a computer-readable storage medium is provided. The computer-readable storage medium includes a computer program. When the computer program is run on an electronic device, the electronic device is enabled to perform the method in any one of the sixth aspect and the implementations of the sixth aspect, the method in any one of the seventh aspect and the implementations of the seventh aspect, the method in any one of the eighth aspect and the implementations of the eighth aspect, or the method in any one of the ninth aspect and the implementations of the ninth aspect.

For any implementation and corresponding technical effects of the tenth aspect, refer to the implementation and the corresponding technical effects of the sixth aspect, the seventh aspect, the eighth aspect, and the ninth aspect and the any implementation and the corresponding technical effects of the sixth aspect, the seventh aspect, the eighth aspect, and the ninth aspect. Details are not described herein.

According to an eleventh aspect, a computer program product is provided. When the computer program product is run on a computer, the computer is enabled to perform the method in any one of the sixth aspect and the implementations of the sixth aspect, the method in any one of the seventh aspect and the implementations of the seventh aspect, the method in any one of the eighth aspect and the implementations of the eighth aspect, or the method in any one of the ninth aspect and the implementations of the ninth aspect.

For any implementation and corresponding technical effects of the eleventh aspect, refer to the implementation and the corresponding technical effects of the sixth aspect, the seventh aspect, the eighth aspect, and the ninth aspect and the any implementation and the corresponding technical effects of the sixth aspect, the seventh aspect, the eighth aspect, and the ninth aspect. Details are not described herein.

BRIEF DESCRIPTION OF DRAWINGS

FIG. 6C is a schematic flowchart of a channel adjustment method according to an embodiment:

FIG. 7B is a schematic flowchart of a channel adjustment method according to an embodiment;

FIG. 8C is a schematic flowchart of a channel adjustment method according to an embodiment:

FIG. 9C is a schematic diagram of result comparison of a channel adjustment method according to an embodiment.

DESCRIPTION OF EMBODIMENTS

Figure 1:
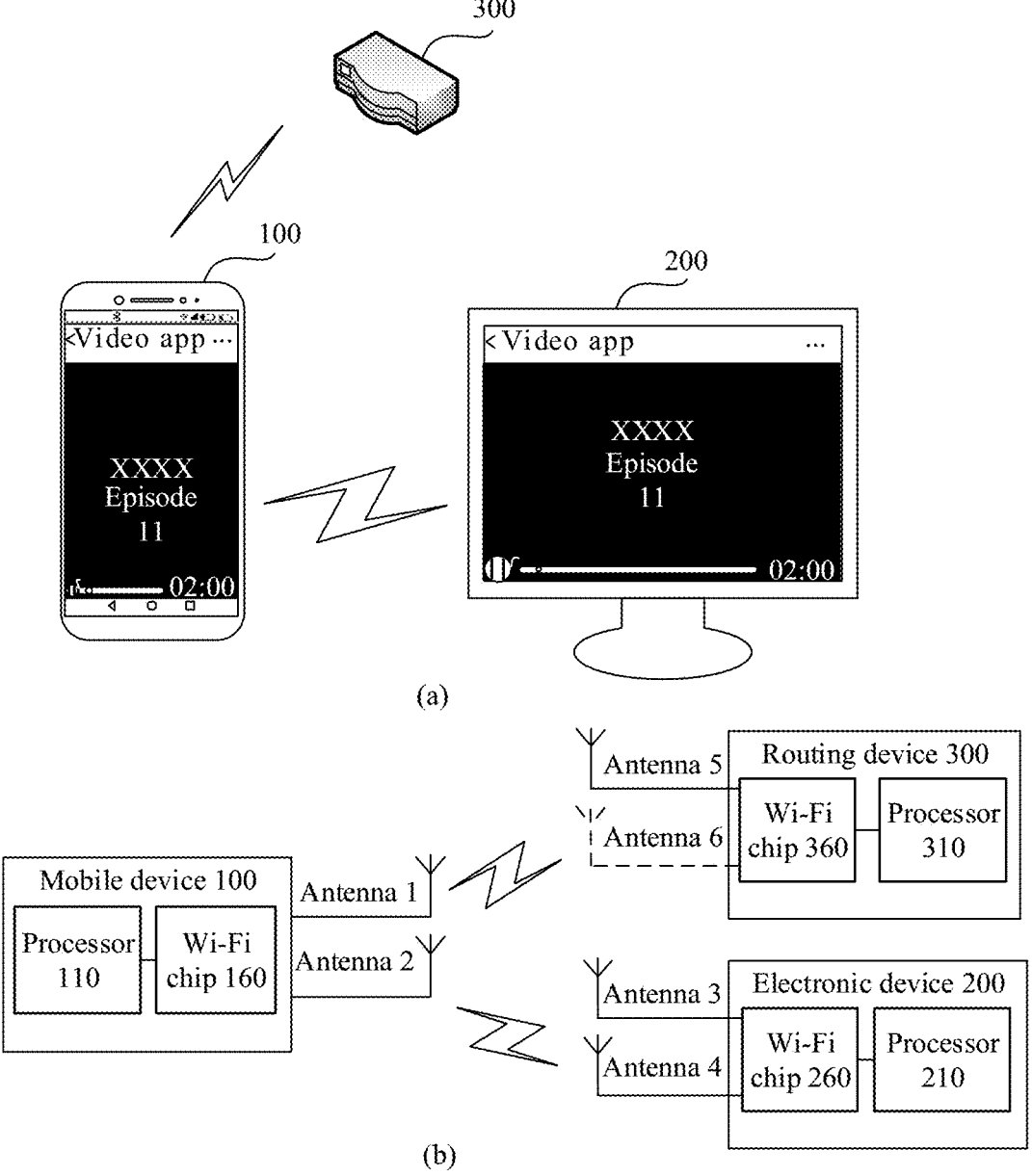
FIG. 1 is a schematic diagram of an application scenario according to an embodiment.

The following describes the technical solutions in embodiments of this disclosure with reference to the accompanying drawings.

Terms used in the following are merely intended to describe particular embodiments, but are not intended to limit this disclosure. The singular expression forms "one", "a", "the", "the foregoing", "this", and "the one" are also intended to include an expression form, for example, "one or more", unless otherwise specified in the context. It should be further understood that in the embodiments of this disclosure, "one or more" means one, two, or more, and "and/or" describes an association relationship between associated objects, and represents that three relationships may exist. For example, A and/or B may represent the following three cases: Only A exists, both A and B exist, and only B exists. A or B may be in a singular form or a plural form. The character "/" usually indicates an "or" relationship between associated objects.

Reference to "one embodiment", "some embodiments", or the like described in this specification means that in one or more embodiments of this disclosure, specific features, structures, or characteristics described with reference to the embodiments are included. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

"A plurality of" in the embodiments of this disclosure means two or more. It should be noted that in descriptions of the embodiments of this disclosure, terms such as "first" and "second" are merely used for distinguishing and description, but should not be understood as indicating or implying relative importance, or should not be understood as indicating or implying a sequence.

To more clearly describe the technical solutions of this disclosure, related concepts are explained below:

A channel is a channel through which a signal is transmitted in a communications system, and includes a transmission medium through which the signal is transmitted from a transmit end to a receive end. According to the IEEE 802.11 protocol, a 2.4 GHZ Wi-Fi frequency band is divided into 13 overlapping channels, and a width of each channel is 22 MHz (in the IEEE 802.11g standard and the IEEE 802.11n standard, a bandwidth of each channel is 20 MHZ, and in the IEEE 802.10B standard, a bandwidth of each channel is 22 MHz); and a 5 GHz Wi-Fi frequency band is divided into 201 channels.

An intra-band inter-channel mode is also referred to as a DBAC mode, and means that two channels that use a Wi-Fi connection respectively communicate with external devices, and the two channels are different channels but belong to a same frequency band. For example, a first channel is occupied to enable a mobile device to project a screen onto an electronic device, a second channel is occupied for interaction between the mobile device and a routing device, and the first channel and the second channel are different channels on a same frequency band (for example, a 5 GHZ Wi-Fi frequency band). In the following description, for convenience, the 5 GHZ. Wi-Fi frequency band and a 2.4 GHz Wi-Fi frequency band are respectively referred to as a 5 GHz frequency band and a 2.4 GHZ frequency band.

An intra-band co-channel mode means that two channels that use a Wi-Fi connection respectively communicate with external devices, and the two channels are a same channel, and belong to a same frequency band. In the foregoing example, the first channel and the second channel are a same channel on a same frequency band.

An inter-band inter-channel mode means that two channels that use a Wi-Fi connection respectively communicate with external devices, and the two channels are different channels, and belong to different frequency bands. In the foregoing example, the first channel and the second channel are different channels on different frequency bands. The inter-band inter-channel mode may be further divided into a dual band adaptive concurrent (DBAC) mode in the inter-band inter-channel mode and a dual band dual concurrent (DBDC) mode in the inter-band inter-channel mode. In the DBDC mode in the inter-band inter-channel mode, a Wi-Fi chip is integrated with two sets of MAC/PHY/RF that respectively work on a 2.4 GHz frequency band and a 5 GHz frequency band, and therefore may work on both the 2.4 GHz frequency band and the 5 GHz frequency band. In the DBAC mode in the inter-band inter-channel mode, a Wi-Fi chip is integrated with only one set of MAC/PHY/RF. The RF has two channels, one channel supports a 2.4 GHz frequency band, and the other channel supports a 5 GHz frequency band. During use, switching is dynamically performed between the 2.4 GHz frequency band and the 5 GHz frequency band, to achieve an effect of implementing communication by performing time division multiplexing on the two frequency bands.

It should be noted that a Wi-Fi connection includes a Wi-Fi peer-to-peer (P2P) connection and a Wi-Fi access point (AP) connection.

For ease of description, description is provided below by using an example in which two operations related to a wireless communications channel are respectively internet access and screen projection. It should be understood that internet access and screen projection are merely examples of the two operations related to the wireless communications channel, and constitute no limitation on this disclosure. All other two operations related to the wireless communications channel fall within the scope of this disclosure.

FIG. 1 is a schematic diagram of an application scenario according to an embodiment of this disclosure. As shown in (a) in FIG. 1, a mobile device 100 includes at least two antennas, an electronic device 200 includes at least two antennas, and a routing device 300 includes at least one antenna. The mobile device 100 establishes a Wi-Fi P2P wireless connection to the electronic device 200, and projects a screen onto the electronic device 200 by using the Wi-Fi P2P wireless connection. In addition, the mobile device 100 establishes a Wi-Fi AP wireless connection to the routing device 300, and performs internet access or another network operation by using the Wi-Fi AP wireless connection. Optionally, the electronic device 200 may further establish a Wi-Fi AP wireless connection to the routing device 300, and perform internet access or another network operation. Alternatively, the mobile device 100 may not be wirelessly connected to the routing device 300, but still project a screen onto the electronic device 200 by using a Wi-Fi P2P wireless connection. The electronic device 200 further establishes a Wi-Fi AP wireless connection to the routing device 300, and performs internet access or another network operation. Alternatively, the routing device 300 may be replaced with two different routing devices. The mobile device 100 and the electronic device 200 respectively establish Wi-Fi AP wireless connections to the two different routing devices, and perform internet access or another network operation by using the wireless connections. In addition, the mobile device 100 establishes a Wi-Fi P2P wireless connection to the electronic device 200, and projects a screen onto the electronic device 200 by using the Wi-Fi P2P wireless connection. A first channel of the Wi-Fi P2P wireless connection is used for wireless screen projection between the mobile device 100 and the electronic device 200, and a second channel of the Wi-Fi AP wireless connection is used for wireless communication between the mobile device 100 and the routing device 300. Optionally, a third channel of the Wi-Fi AP wireless connection is used for wireless communication between the electronic device 200 and the routing device 300. In an implementation, both the Wi-Fi P2P connection and the Wi-Fi AP connection work on a 2.4 GHz frequency band and a 5 GHz frequency band.

As shown in (b) in FIG. 1, the mobile device 100 includes a processor 110, a Wi-Fi chip 160, an antenna 1, and an antenna 2. The Wi-Fi chip 160 is connected to the processor 110, and both the antenna 1 and the antenna 2 are connected to the Wi-Fi chip 160. The electronic device 200 includes a processor 210, a Wi-Fi chip 260, an antenna 3, and an antenna 4. The Wi-Fi chip 260 is connected to the processor 210, and both the antenna 3 and the antenna 4 are connected to the Wi-Fi chip 260. The routing device 300 includes a processor 310, a Wi-Fi chip 360, an antenna 5, and an antenna 6. The Wi-Fi chip 360 is connected to the processor 310, and both the antenna 5 and the antenna 6 are connected to the Wi-Fi chip 360. The antenna 1 and/or the antenna 2 in the mobile device 100 wirelessly communicate/communicates with the antenna 3 and/or the antenna 4 in the electronic device. It should be emphasized that both the antenna 1 and the antenna 2 in (b) in FIG. 1 are examples of the mobile device 100, and all mobile devices that include antennas that are connected to a Wi-Fi chip and whose quantity is greater than 2 fall within the protection scope of this disclosure. Correspondingly, for the electronic device 200, all electronic devices that include antennas that are connected to a Wi-Fi chip and whose quantity is greater than 2 fall within the protection scope of this disclosure. Frequency bands and channels on which the antenna 1 to the antenna 4 work are optionally set. In an implementation, the frequency bands are limited to the 2.4 GHz frequency band and the 5 GHz frequency band.

The mobile device in this embodiment of this disclosure includes but is not limited to a smartphone, a smart headset, a tablet computer, or a wearable electronic device (for example, a smart watch, a smart band, a smart ring, or a pair of smart glasses) having a wireless communication function. An example embodiment of the mobile device includes but is not limited to a portable electronic device in which iOS®, Android®, Microsoft®, Windows, Linux, or another operating system is installed. The mobile device may alternatively be another portable electronic device, for example, a laptop computer. It should be further understood that in some other embodiments, the mobile device may not be a portable electronic device, but is a stationary electronic device such as a desktop computer.

For ease of description, in the following description, when the mobile device 100) establishes a Wi-Fi AP wireless connection to the routing device 300, and the electronic device 200 establishes a Wi-Fi AP wireless connection to the routing device 300, it is set that the mobile device 100 and/or the electronic device 200 are/is to perform internet access.

Figure 2:
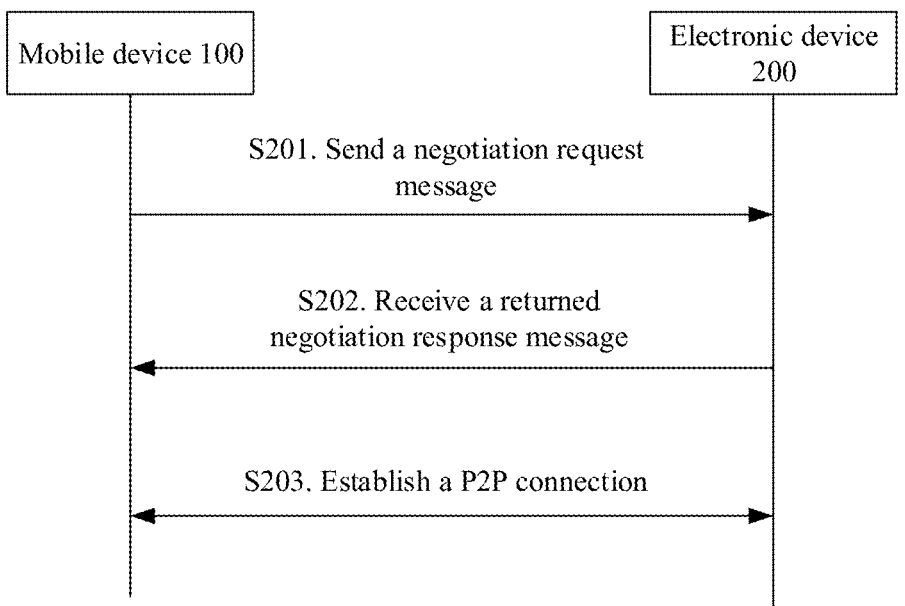
FIG. 2 is a schematic flowchart of a Wi-Fi P2P connection according to an embodiment.

As shown in FIG. 2, a process in which the mobile device 100 establishes a Wi-Fi P2P connection to the electronic device 200 may include the following steps.

S201. The mobile device 100 sends a negotiation request message to the electronic device 200.

Specifically, in an implementation, the negotiation request message may carry ID information or address information of the mobile device 100, ID information or address information of the electronic device 200, and Wi-Fi P2P connection capability information of the mobile device 100. The Wi-Fi P2P connection capability information of the mobile device 100 may include indication information indicating whether the mobile device 100 can establish a Wi-Fi P2P connection and even a role of the mobile device 100, for example, a group owner (GO) role.

S202. The mobile device 100 receives a negotiation response message returned by the electronic device 200.

Specifically, in an implementation, the negotiation response message may include the ID information or the address information of the mobile device 100, the ID information or the address information of the electronic device 200, and Wi-Fi P2P connection capability information of the electronic device 200. The Wi-Fi P2P connection capability information of the electronic device 200 may include indication information indicating whether the electronic device 200 can establish a Wi-Fi P2P connection and even a role of the electronic device 200, for example, a group client (GC) role. In addition, the negotiation response message is further used to determine a channel to be used for a P2P connection.

S203. The mobile device 100 establishes a Wi-Fi P2P connection to the electronic device 200.

Specifically, in an implementation, the mobile device 100 performs the following operation based on the Wi-Fi P2P connection capability information and the role of the mobile device 100 and the Wi-Fi P2P connection capability information and the role of the electronic device 200. After both the mobile device 100 and the electronic device 200 have Wi-Fi P2P connection capabilities and the mobile device 100 and the electronic device 200 reach a consensus on roles, for example, the mobile device 100 is in the GO role, and the electronic device 200 is in the GC role, the mobile device 100 switches the mobile device 100) to an AP mode, and the electronic device 200 is in the GC role, and is connected to the mobile device 100. Therefore, the mobile device 100 establishes a Wi-Fi P2P connection to the electronic device 200. Optionally, the mobile device 100 may alternatively be in the GC role, and the electronic device 200 may alternatively be in the GO role. Determining of the GC role and the GO role is a well-known technology in the art. Details are not described herein. For determining of the GC role and the GO role, channel adjustment may be subsequently preferably performed by using the GC role as a reference, or channel adjustment may be subsequently preferably performed by using the GO role as a reference.

It should be noted that after the Wi-Fi P2P connection is established between the mobile device that is in the GO role and the electronic device that is in the GC role, the P2P connection may be a one-to-one connection or a many-to-one connection.

Figure 3:
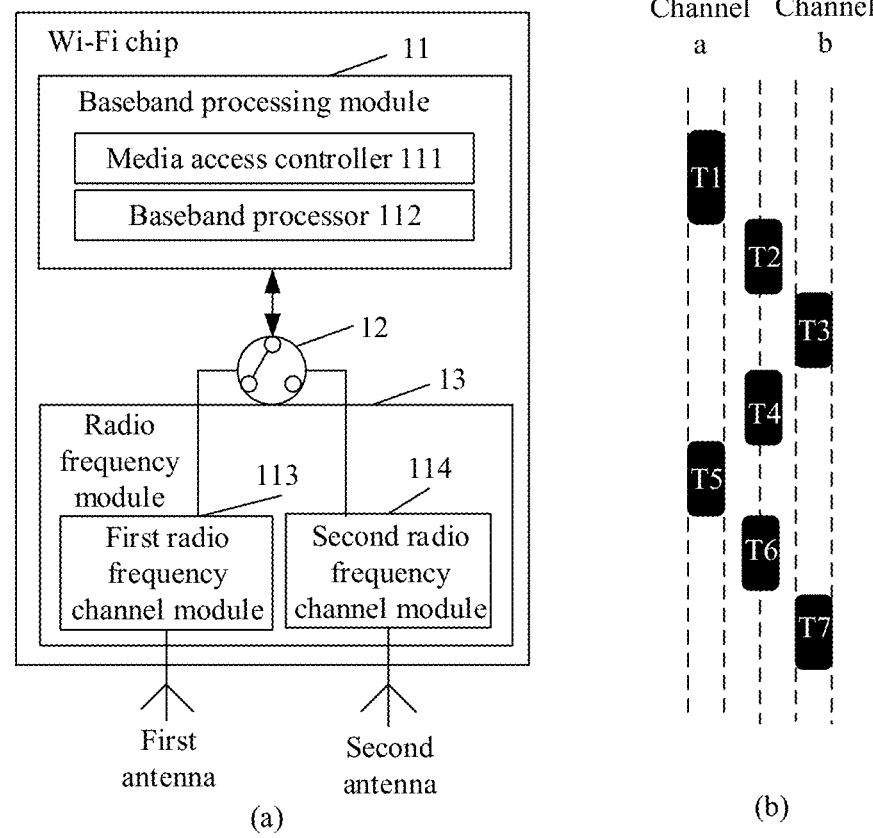
FIG. 3 is a schematic diagram of a principle of time division scheduling existing when a mobile device is in a DBAC mode according to an embodiment.

A working principle of time division scheduling existing when a mobile device is in a DBAC mode is described below with reference to FIG. 3. FIG. 3 is a schematic diagram of a principle of time division scheduling performed by a mobile device in a DBAC mode by using an intra-band inter-channel mode according to an embodiment of this disclosure. As shown in (a) in FIG. 3, a Wi-Fi chip in this embodiment may include a baseband processing module 11, a switch 12, and a radio frequency (ratio frequency. RF) module 13. The baseband processing module may include a media access controller 111 and a baseband processor 112. The RF module 13 may include a first radio frequency channel module 113 and a second radio frequency channel module 114. The first radio frequency channel module 113 and the second radio frequency channel module 114 share the baseband processing module 11, and the two radio frequency channel modules are connected to the baseband processor 11 by using the switching switch 12.

As shown in (b) in FIG. 3, when the mobile device 100 is in the DBAC mode, an example in which a channel (namely, a channel a in (b) in FIG. 3) used by the mobile device 100 to wirelessly project a screen onto an electronic device 200 is a channel 149 on a 5 GHZ frequency band, and a channel (namely, a channel b in (b) in FIG. 3) used for wireless communication between the mobile device 100 and a routing device 300 is a channel 36 on the 5 GHz frequency band is used. In a time unit T1, the mobile device 100 can perform screen projection only through the channel 149 on the 5 GHz frequency band, and the second radio frequency channel module 114 in the Wi-Fi chip is connected to the switch 12. In a time unit T3, the mobile device 100 can perform internet access only through the channel 36 on the 5 GHz frequency band, and the first radio frequency channel module 113 in the Wi-Fi chip is connected to the switch 12. Similarly, in a time unit T5, the mobile device 100 can perform screen projection only through the channel 149 on the 5 GHz frequency band. In a time unit T7, the mobile device 100 can perform internet access only through the channel 36 on the 5 GHz frequency band. However, in a time unit T2, a time unit T4, and a time unit T6, the mobile device 100 needs to perform switching between the radio frequency channel modules, and cannot use any channel. It may be learned that there is an additional increase in overheads of the mobile device 100 due to time division scheduling and channel switching caused due to time division scheduling. Consequently, the mobile device 100 cannot use a first channel or a second channel in a relatively large quantity of time units. For example, the mobile device 100 cannot perform screen projection through the first channel in the time units T2 to T4 and the time units T6 and T7, and the mobile device 100 cannot perform internet access through the second channel in the time units T1 and T2 and the time units T4 to T6. Therefore, time utilization of the first channel and the second channel is relatively low. Consequently, a speed of screen projection and a speed of internet access are sometimes relatively high and sometimes relatively low; and there is frame freezing in during screen projection and internet access. In addition, the two channels work on a same frequency band, and frequencies of the channels are close to each other, and consequently mutual interference is prone to occur. Therefore, there is relatively poor user experience during screen projection and internet access.

Similarly, there is also the foregoing problem when the electronic device 200 is in the DBAC mode. Details are not described herein.

After finding the technical problem through long-term research, the inventor further makes in-depth research to summarize respective characteristics of a DBDC mode in an inter-band inter-channel mode and an intra-band co-channel mode. The characteristics of the DBDC mode in the inter-band inter-channel mode are as follows: A Wi-Fi chip does not perform switching between a plurality of antennas used for Wi-Fi communication, and there is relatively good channel quality, a relatively low packet loss rate, and a relatively low delay. The characteristics of the intra-band co-channel mode are as follows: A Wi-Fi chip does not perform switching between a plurality of antennas used for Wi-Fi communication, and a throughput rate of a single channel is relatively high.

After the foregoing in-depth and long-term research, to resolve the technical problem, the embodiments of this disclosure provide a channel adjustment method and an electronic device. When only a same Wi-Fi chip is used for a plurality of antennas, and when a user uses a mobile device and/or an electronic device for two different purposes by performing Wi-Fi communication, transmission speeds in the case of the two different purposes remain stable, and there is relatively continuous and fluent experience in the case of the two purposes, to improve user experience. Specifically, for a mobile device and/or an electronic device that supports a plurality of antennas, when a relationship between a first channel and a second channel of the mobile device and/or the electronic device is a DBAC mode, the relationship between the first channel and the second channel is adjusted from the DBAC mode to an intra-band co-channel mode or a DBDC mode in an inter-band inter-channel mode, to improve time utilization of the first channel and the second channel and ensure a speed of internet access and a speed of screen projection, so that internet access and screen projection are continuous and fluent, to avoid frame freezing during internet access and screen projection, so as to improve user experience.

Before the embodiments of this disclosure are described in detail, hardware structures and software structures of a mobile device and an electronic device to which the embodiments of this disclosure are applied are first described.

Figure 4:
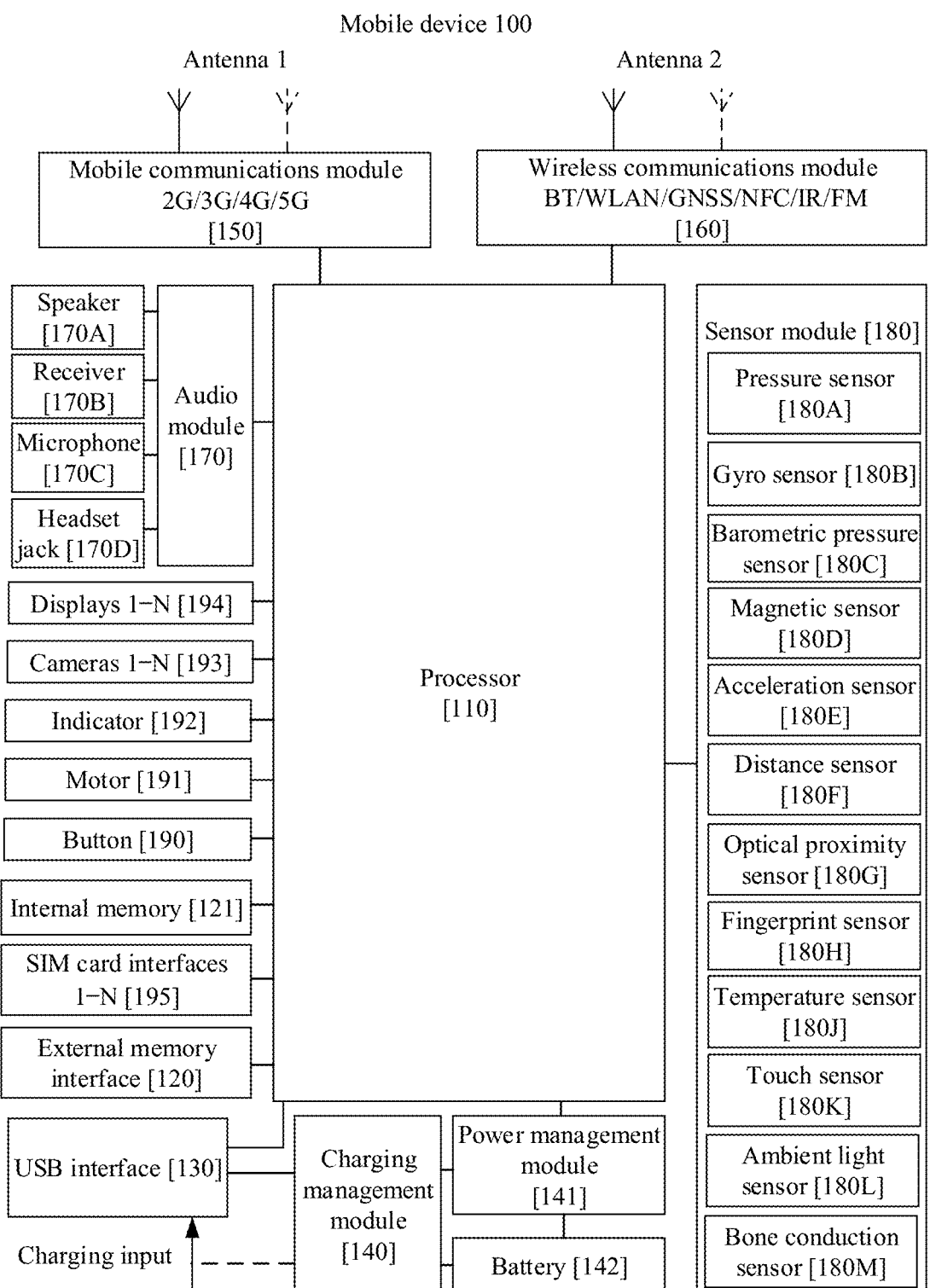
FIG. 4 is a schematic diagram of a hardware structure of a mobile device according to an embodiment.

FIG. 4 is a schematic diagram of a hardware structure of a mobile device 100. As shown in FIG. 4, the mobile device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G a fingerprint sensor 180H, a temperature sensor 180J, a touch sensor 180K, an ambient light sensor 180L, a bone conduction sensor 180M, and the like.

It may be understood that the structure shown in this embodiment of this disclosure constitutes no specific limitation on the mobile device 100. In some other embodiments of this disclosure, the mobile device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The mobile device 100 may implement a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The mobile device 100 can implement a photographing function by using the ISP, the camera 193, the video codec, the GPU, the display 194, the application processor, and the like.

The SIM card interface 195 is configured to connect to a SIM card. The SIM card may be inserted into the SIM card interface 195 or removed from the SIM card interface 195, to implement contact with or separation from the mobile device 100. The mobile device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 is compatible with different types of SIM cards. The SIM card interface 195 is also compatible with an external storage card. The mobile device 100 interacts with a network through the SIM card, to implement functions such as calling and data communication. In some embodiments, an eSIM, namely, an embedded SIM card, is used in the mobile device 100.

A wireless communication function of the mobile device 100 may be implemented by using the antenna 1, the antenna 2, the mobile communications module 150, the wireless communications module 160, the modem processor, the baseband processor, and the like. The antenna 1 and the antenna 2 are configured to transmit and receive an electromagnetic wave signal. Each antenna in the mobile device 100 may be configured to cover one or more communication bands. Different antennas may be further multiplexed, to improve antenna utilization. For example, the antenna 1 may be multiplexed as a diversity antenna of a wireless local area network. In some other embodiments, an antenna may be used in combination with a tuning switch.

The mobile communications module 150 may provide a solution to wireless communication such as 2G/3G/4G/5G applied to the mobile device 100. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some functional modules in the mobile communications module 150 may be disposed in a same device as at least some modules of the processor 110.

The wireless communications module 160 may provide a wireless communication solution that is applied to the mobile device 100, and that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the mobile device 100 are coupled, and the antenna 2 and the wireless communications module 160 in the mobile device 100 are coupled, so that the mobile device 100 can communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like.

For a structure of an electronic device 200, refer to the structure of the mobile device 100 in FIG. 4. Details are not described herein. In some other embodiments of this disclosure, the electronic device 200 may include more or fewer components than those shown in the figure, combine some components, split some components, or have different component arrangements. The components shown in the figure may be implemented by using hardware, software, or a combination of software and hardware.

Figure 5:
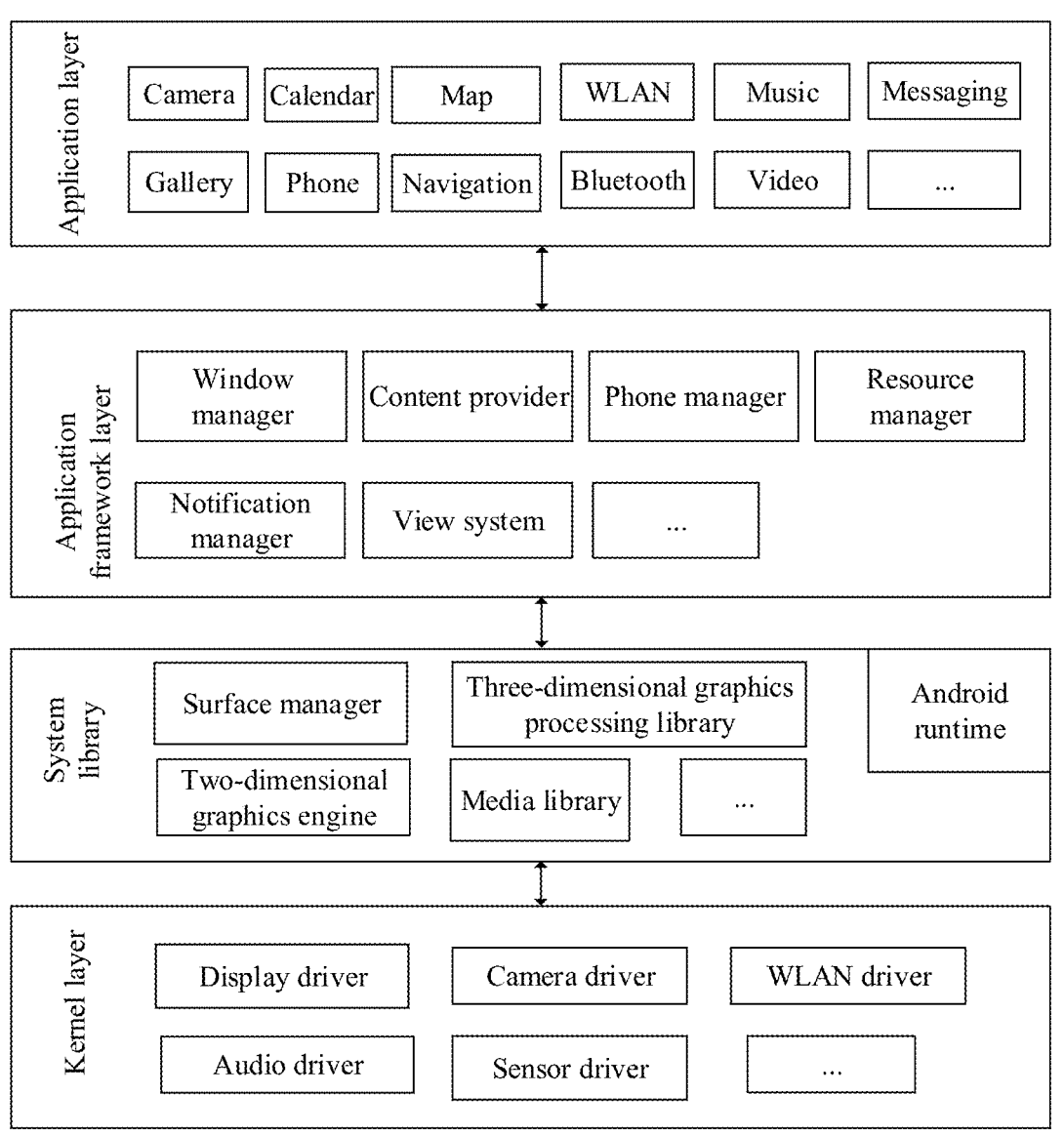
FIG. 5 is a schematic diagram of a software structure of a mobile device according to an embodiment.

A software system of the mobile device 100 may use a layered architecture, an event-driven architecture, a microkernel architecture, a micro service architecture, or a cloud architecture. FIG. 5 is a schematic diagram of a software structure of a mobile device 100 according to an embodiment of this disclosure. In a layered architecture, software is divided into several layers, and each layer has a clear role and task. The layers communicate with each other through a software interface. In some embodiments, the Android system is divided into four layers that are respectively an application layer, an application framework layer (FWK), an Android runtime and system library, and a kernel layer from top to bottom.

The application layer may include a series of application packages. As shown in FIG. 5, the application layer may include Camera, WeChat, QQ, Gallery, Calendar, Phone, Map, Navigation, WLAN, Bluetooth, Music, Video, Messaging, and the like.

The application framework layer provides an application programming interface (API) and a programming framework for an application at the application layer. The application framework layer includes some predefined functions. As shown in FIG. 5, the application framework layer may include a window manager, a content provider, a view system, a phone manager, a resource manager, a notification manager, and the like. The window manager is configured to manage a window program. The window manager may obtain a size of a display, determine whether there is a status bar, perform screen locking, take a screenshot, and the like. The content provider is configured to store and obtain data, and enable the data to be accessed by an application. The data may include a video, an image, audio, calls that are made and received, a browsing history and a bookmark, an address book, and the like. The view system includes visual controls, such as a control for displaying a text and a control for displaying an image. The view system may be configured to construct an application. A display interface may include one or more views. The phone manager is configured to provide a communication function of the mobile device 100, for example, management of a call status (including answering, declining, or the like). The resource manager provides, for an application, various resources such as a localized character string, an icon, a picture, a layout file, and a video file. The notification manager enables an application to display notification information in the status bar, and may be configured to convey a notification-type message. The displayed information may automatically disappear after a short pause without user interaction. The notification manager may alternatively be a notification that appears in a top status bar of the system in a form of a graph or a scroll bar text, for example, a notification of an application that is run on a background, or may be a notification that appears on the screen in a form of a dialog window: For example, text information is displayed in the status bar, an announcement is given, the electronic device vibrates, or the indicator light blinks.

The Android runtime includes a kernel library and a virtual machine. The Android runtime is responsible for scheduling and management of the Android system. The kernel library includes two parts: a function that needs to be called in Java language, and a kernel library of Android. The application layer and the application framework layer run on a virtual machine. The virtual machine executes Java files at the application layer and the application framework layer as binary files. The virtual machine is configured to perform functions such as object lifecycle management, stack management, thread management, security and exception management, and garbage collection. The system library may include a plurality of functional modules, for example, a surface manager, a media library, a three-dimensional graphics processing library (for example, OpenGL ES), and a 2D graphics engine (for example, SGL). The surface manager is configured to manage a display subsystem and provide fusion of 2D and 3D layers for a plurality of applications. The media library supports playing and recording of a plurality of commonly used audio and video formats, static image files, and the like. The media library may support a plurality of audio and video encoding formats, for example, MPEG-4, H.264, MP3, AAC, AMR, JPG and PNG The three-dimensional graphics processing library is configured to implement three-dimensional graphics drawing, image rendering, composition, layer processing, and the like. The 2D graphics engine is a drawing engine for 2D drawing. In addition, the system library may further include a relative angle detection module, configured to detect a relative angle between another device and the mobile device 100. The relative angle may include an orientation of the another device relative to the mobile device 100 and the like.

The kernel layer is a layer between hardware and software. The kernel layer includes at least a display driver, a camera driver, an audio driver, a sensor driver, and a WLAN driver.

For a software system of an electronic device 200, refer to the software system shown in FIG. 5. Details are not described herein. In some other embodiments of this disclosure, the electronic device 200 may include more or fewer components than those shown in the figure, combine some components, split some components, or have different component arrangements.

To more clearly describe the technical solutions provided in this disclosure, the channel adjustment method provided in this disclosure is described below by using a plurality of embodiments.

Embodiment 1

Figure 6A:
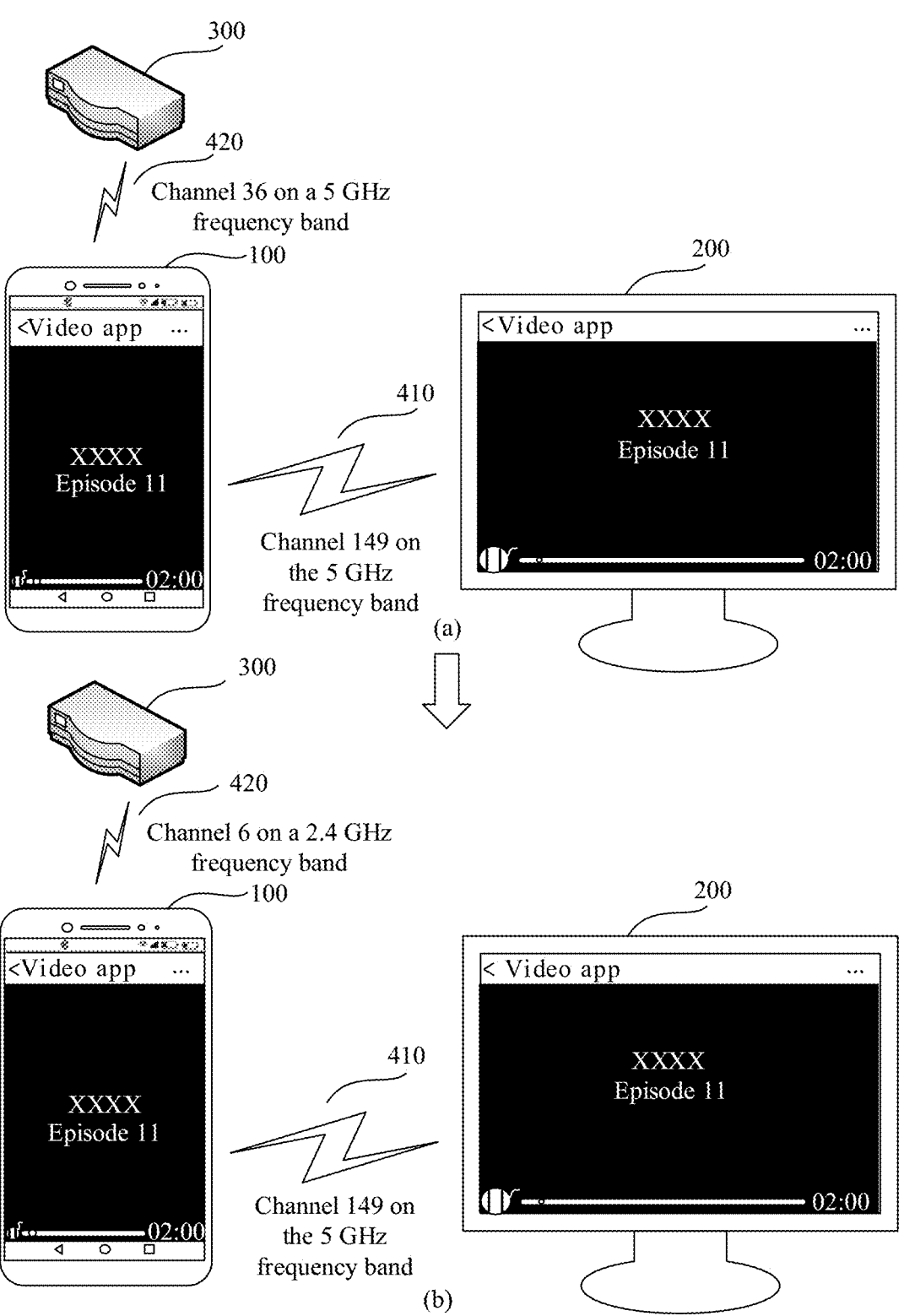
FIG. 6A and FIG. 6B are schematic diagrams of result comparison of a channel adjustment method according to an embodiment.
Figure 6B:
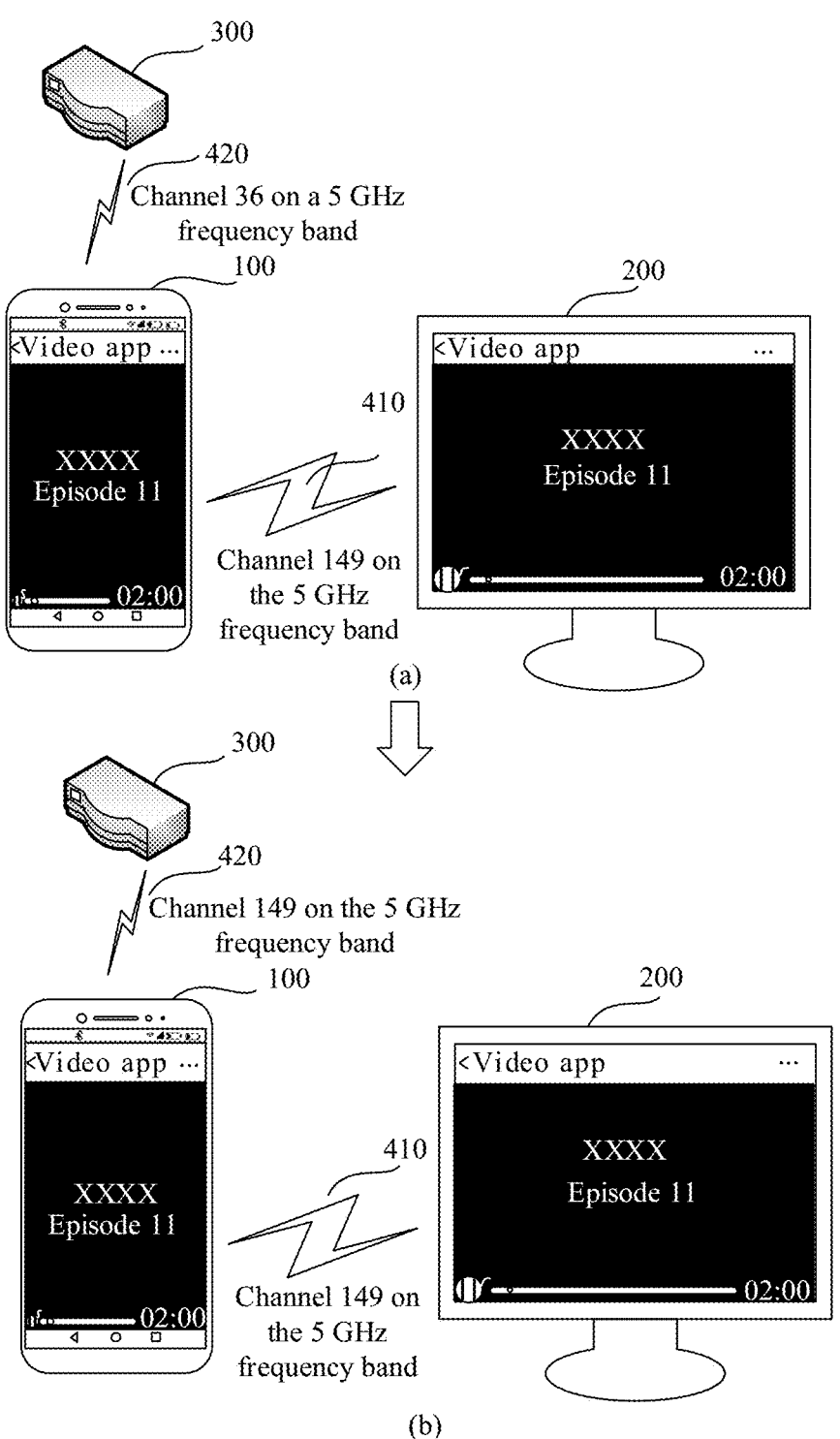
Figure 6D:
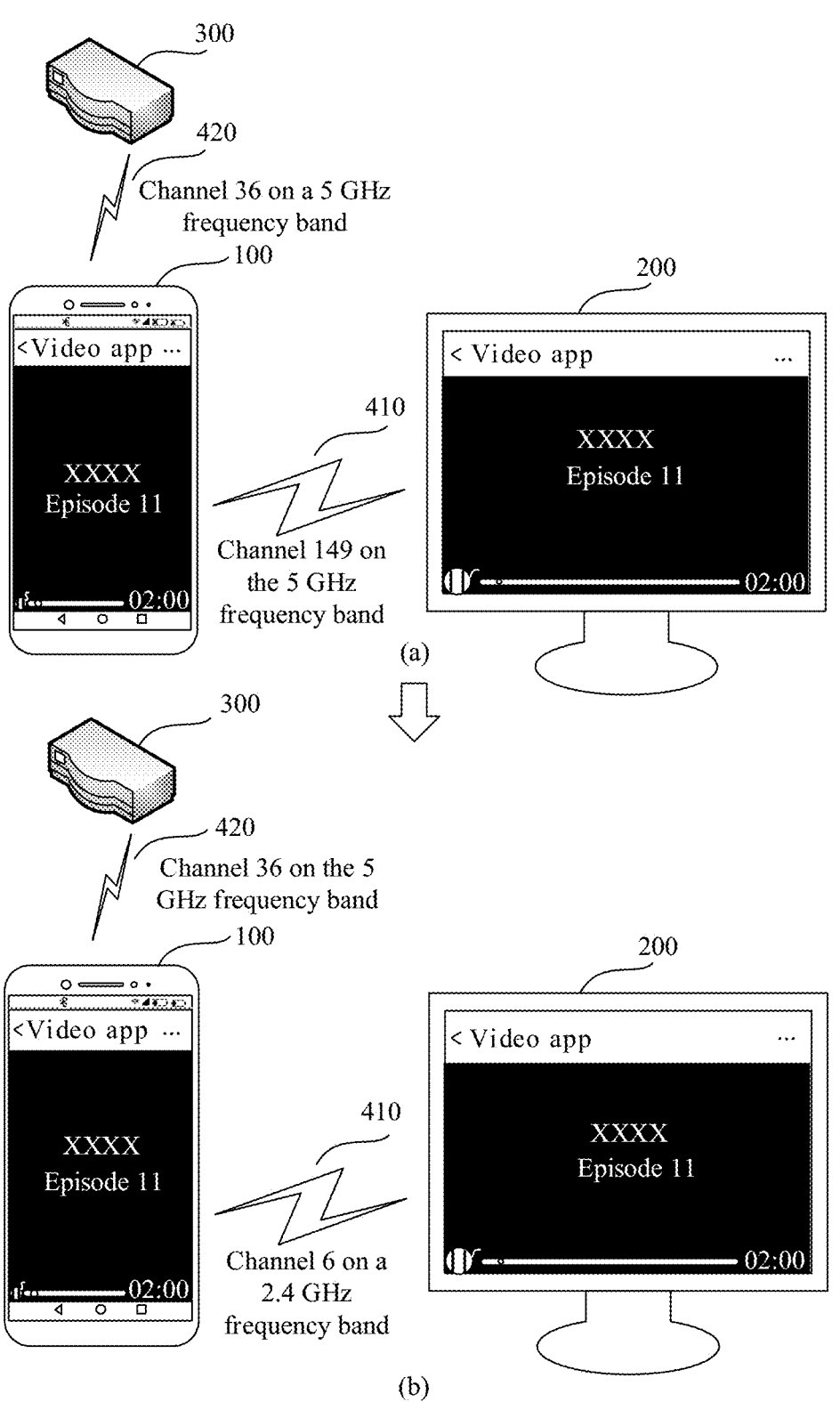
FIG. 6D is a schematic diagram of result comparison of a channel adjustment method according to an embodiment.
Figure 6E:
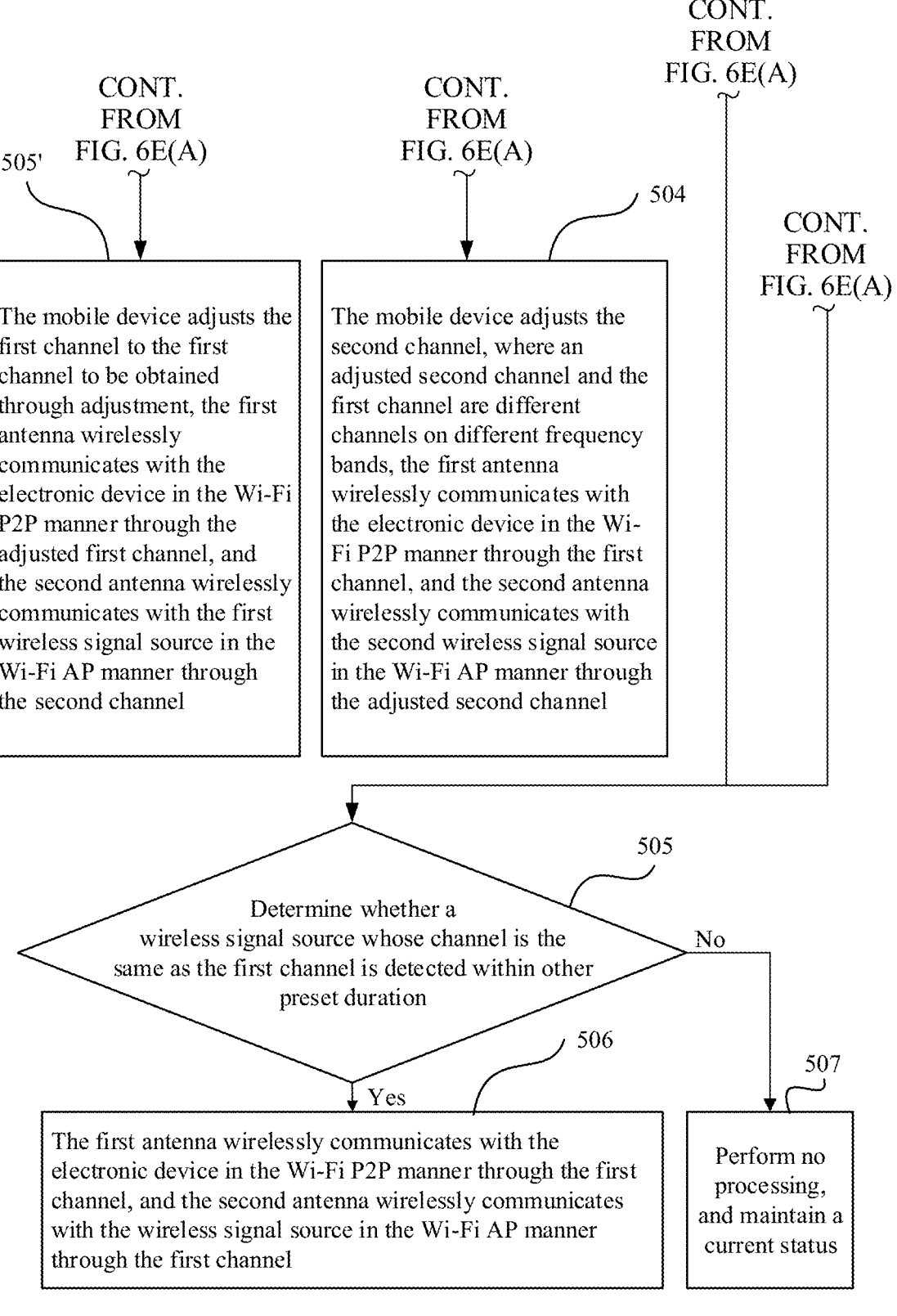
FIG. 6E is a schematic flowchart of a channel adjustment method according to an embodiment.

Embodiment 1 of this disclosure relates to FIG. 6A to FIG. 6E(A) and FIG. 6E(B). As shown in (a) in FIG. 6A, after a mobile device 100 establishes a Wi-Fi P2P connection to an electronic device 200, the mobile device 100 wirelessly projects a screen onto the electronic device 200 through a first channel 410. After the mobile device 100 establishes a Wi-Fi AP connection to a routing device 300, the mobile device 100 wirelessly communicates with the routing device 300 through a second channel 420. In this case, the mobile device works in a DBAC mode. For clearer description, description is provided below by using an example in which the mobile device 100 performs internet access with the routing device 300 through the second channel. For example, the first channel 410 is a channel 149 on a 5 GHZ frequency band, and the second channel is a channel 36 on the 5 GHz frequency band. A relationship between the first channel and the second channel is a relationship of the DBAC mode. It may be learned from the foregoing analysis that when the first channel and the second channel of the mobile device 100 form the relationship of the DBAC mode, time utilization of each of the first channel and the second channel is relatively low; transmission cannot be performed on both the channels for relatively long duration, transmission sometimes can be performed on the two channels, and transmission sometimes cannot be performed, and consequently there is frame freezing during transmission on both the first channel and the second channel, and internet access and/or screen projection are/is affected. In addition, the two channels are on a same frequency band, and mutual interference is prone to occur. Consequently, there is relatively poor user experience during internet access and screen projection. To resolve this problem, this embodiment of this disclosure provides a channel adjustment method. A procedure of the channel adjustment method in Embodiment 1 is described below with reference to FIG. 6C. As shown in FIG. 6C, specific steps in the channel adjustment method are as follows:

Step 501: A first antenna in the mobile device wirelessly communicates with the electronic device in a Wi-Fi P2P connection manner through the first channel, a second antenna in the mobile device wirelessly communicates with a first wireless signal source in a Wi-Fi AP connection manner through the second channel, and the mobile device determines that the first channel and the second channel are in an intra-band inter-channel relationship, and time division multiplexing is performed on the first antenna and the second antenna, where a Wi-Fi chip in the mobile device enables the first antenna in the mobile device and the second antenna in the mobile device to simultaneously, respectively, and independently send signals through different channels on two different frequency bands.

Specifically, the first antenna in the mobile device 100 may first wirelessly communicate with the electronic device 200 in the Wi-Fi P2P connection manner through the first channel, and then after the mobile device 100 receives a user operation, the second antenna in the mobile device 100 wirelessly communicates with the first wireless signal source of the routing device 300 in the Wi-Fi AP connection manner through the second channel.

Alternatively, the second antenna in the mobile device 100 may first wirelessly communicate with the first wireless signal source of the routing device 300 in the Wi-Fi AP connection manner through the second channel, and then after a user operation is received, the first antenna in the mobile device 100 wirelessly communicates with the electronic device in the Wi-Fi P2P connection manner through the first channel.

The user operation includes but is not limited to a touch operation or a voice input operation.

Optionally, before the mobile device 100 determines that the first channel and the second channel are in the intra-band inter-channel relationship, the mobile device 100 obtains channel information of the first channel and channel information of the second channel. The channel information of the first channel includes the first channel and a frequency band to which the first channel belongs, for example, the channel 149 on the 5 GHz frequency band. The channel information of the second channel includes the second channel and a frequency band to which the second channel belongs, for example, the channel 36 on the 5 GHZ frequency band.

For example, the first wireless signal source is the routing device 300 (the routing device provides only one wireless signal source) or a wireless signal source provided by the routing device 300 (the routing device may provide a plurality of wireless signal sources).

For example, the mobile device 100 may obtain the channel information of the first channel in an interface function scheduling manner shown in Table 1, and may obtain the channel information of the second channel in an interface function scheduling manner shown in Table 2.

TABLE 1

```
int p2pFreq; //used to save a frequency of subsequently obtaining
the connected Wi-Fi P2P
    Wi-FiP2pManager  Wi-FiP2pManager  =  (Wi-FiP2pManager)
context.getSystemService(Context.WI-FI_P2P_SERVICE); //obtain the
Wi-Fi P2P service
    Wi-FiP2pChannel Wi-FiP2pChannel  =
    Wi-FiP2pManager.initialize(context,
context.getMainLooper( ), this); //establish a connection between an
application and the Wi-Fi P2P service
    Wi-FiP2pManager.requestGroupInfo(Wi-FiP2pChannel,   new
Wi-FiP2pManager.GroupInfoListener( ) {
```

US 12,574,905 B2

23
24

TABLE 1-continued

```
  @Override
  public void onGroupInfoAvailable(Wi-FiP2pGroup Wi-FiP2pGroup) {
    p2pFreq = Wi-FiP2pGroup.getFrequency( );
  }
}); //request the frequency of obtaining the Wi-Fi P2P. Information
about the Wi-Fi P2P is notified in the onGroupInfoAvailable
callback mode
```

TABLE 2

```
  int curWi-FiFreq; //save a frequency of subsequently obtaining
  the connected Wi-Fi
  Wi-FiManager  Wi-FiManager  =  (Wi-FiManager)
  context.getSystemService(Context.WI-FI_SERVICE); //obtain the
  Wi-Fi AP service
    Wi-FiInfo Wi-FiInfo = Wi-FiManager.getConnectionInfo( );
  //obtain Wi-Fi AP connection information
    curWi-FiFreq = Wi-FiInfo.getFrequency( ); //obtain the
  frequency of the connected Wi-Fi AP
```

Then, after determining, based on the obtained channel information of the first channel and the obtained channel information of the second channel, that the first channel and the second channel form the relationship of the DBAC mode, the mobile device 100 performs step 502.

Step 502: The mobile device determines whether the Wi-Fi chip in the mobile device supports a DBDC mode in an inter-band inter-channel mode.

In an implementation, if the mobile device supports the DBDC mode in the inter-band inter-channel mode, step 503 is performed; or if the mobile device does not support the DBDC mode in the inter-band inter-channel mode, step 505 is performed.

In another implementation, if the mobile device supports the DBDC mode in the inter-band inter-channel mode, step 503 is performed; or if the mobile device does not support the DBDC mode in the inter-band inter-channel mode, no processing is performed, and a current status is maintained.

Step 503: Determine whether a second wireless signal source whose frequency band is different from a frequency band of the first wireless signal source is detected within preset duration.

Specifically, the mobile device determines, through scanning, whether the second wireless signal source whose frequency band is different from the frequency band of the first wireless signal source is detected within the preset duration. If the mobile device determines, through scanning, that the second wireless signal source whose frequency band is different from the frequency band of the first wireless signal source is detected within the preset duration, step 504 is performed. If the second wireless signal source whose frequency band is different from the frequency band of the first wireless signal source is not detected within the preset duration, step 505 is performed.

A specific scanning manner may be as follows: The mobile device 100 scans a surrounding wireless signal source, and after the preset duration, determines, in a scanning result, whether there is a wireless signal source whose frequency band is different from a frequency band of a Wi-Fi AP network currently accessed by the mobile device 100 and whose frequency band is a frequency band supported by the mobile device 100. Alternatively, the mobile device 100 first obtains a frequency band (for example, a 2.4 GHz frequency band) that is supported by the mobile device 100 and that is different from the frequency band to which the first channel 410 belongs, and then the mobile device 100 scans a surrounding wireless signal source, and after the preset duration, determines, in a scanning result, whether there is a wireless signal source whose frequency band is different from a frequency band of a Wi-Fi AP network currently accessed by the mobile device 100.

Step 504: The mobile device adjusts the second channel, where an adjusted second channel and the first channel are different channels on different frequency bands, the first antenna in the mobile device wirelessly communicates with the electronic device in the Wi-Fi P2P connection manner through the first channel, and the second antenna in the mobile device wirelessly communicates with the second wireless signal source in the Wi-Fi AP connection manner through the adjusted second channel.

For example, as shown in (a) in FIG. 6A, the second channel 420 is the channel 36 on the 5 GHz frequency band, the frequency band to which the second channel 420 belongs is the 5 GHz frequency band, and a Wi-Fi AP network currently accessed by the second channel 420 is a wireless network on the 5 GHz frequency band of the routing device 300; and the first channel 410 is the channel 149 on the 5 GHz frequency band, the frequency band to which the first channel 410 belongs is the 5 GHz frequency band, and the mobile device 100 projects a screen onto the electronic device 200 through the first channel 410 of the Wi-Fi P2P connection. After step 504 is performed, as shown in (b) in FIG. 6A, the mobile device 100 adjusts the second channel 420 from the channel 36 on the 5 GHz frequency band to a channel 6 on the 2.4 GHz frequency band. In this case, the first channel 410 and the second channel 420) of the mobile device 100 no longer form a relationship of an intra-band inter-channel mode, but form the relationship of the DBDC mode in the inter-band inter-channel mode. In this way, speeds of transmission on the first channel 410 and transmission on the second channel 420 are ensured, no time division scheduling is performed, and no frame freezing occurs during screen projection and internet access of a user due to a channel reason. In addition, interference between the first channel 410 and the second channel 420 is reduced, and therefore user experience is improved.

Step 505: Determine whether a wireless signal source whose channel is the same as the first channel is detected within other preset duration.

Specifically, the mobile device determines, through scanning, whether the wireless signal source whose channel is the same as the first channel is detected within the other preset duration. If the mobile device determines, through scanning, that the wireless signal source whose channel is the same as the first channel is detected within the other preset duration, step 506 is performed. Otherwise, step 507 is performed.

A specific scanning manner may be as follows: The mobile device 100 scans a surrounding wireless signal source, and after the other preset duration, determines, in a scanning result, whether there is a wireless signal source whose channel is the same as the first channel of the Wi-Fi AP network currently accessed by the mobile device 100.

The other preset duration in step 505 may be the same as or different from the preset duration in step 503.

The wireless signal source in step 505 may be the second wireless signal source or another wireless signal source.

Step 506: The first antenna in the mobile device wirelessly communicates with the electronic device in the Wi-Fi P2P connection manner through the first channel, and the second antenna in the mobile device wirelessly communicates with the first wireless signal source in the Wi-Fi AP connection manner through the first channel.

As shown in (a) in FIG. 6B, the first channel 410 is the channel 149 on the 5 GHZ frequency band, the frequency band to which the first channel 410 belongs is the 5 GHZ frequency band, and a frequency band of a wireless signal source of the Wi-Fi AP network currently accessed by the second channel 420 is the 5 GHz frequency band. In the foregoing scanning, after scanning, the mobile device 100 does not detect, within the preset duration, a wireless signal source whose frequency band is a frequency band other than the 5 GHZ frequency band. Therefore, although the mobile device 100 supports the DBDC mode in the inter-band inter-channel mode, the relationship between the second channel 420 and the first channel 410 cannot be adjusted to an inter-band inter-channel relationship, and instead whether the wireless signal source whose channel is the same as the first channel is detected within the other preset duration is determined. If the wireless signal source whose channel is the same as the first channel is detected within the other preset duration, as shown in (b) in FIG. 6B, the second channel 420 is adjusted from the channel 36 on the 5 GHz frequency band to the channel 149 on the 5 GHz frequency band. The first channel 410) and the second channel 420 in this case form a relationship of an intra-band co-channel mode. If the wireless signal source whose channel is the same as the first channel is not detected within the other preset duration, no processing is performed, and a current status is maintained. In this way, speeds of transmission on the first channel 410 and transmission on the second channel 420) are ensured, no time division scheduling is performed, and no frame freezing occurs during screen projection and internet access of a user due to a channel reason. Therefore, user experience is improved.

Step 507: Perform no processing, and maintain a current status.

In an implementation, the method may not include step 505, and in the foregoing procedure, step 506 may be directly performed at a position at which step 505 is involved. For example, after a determining result in step 502 is no, step 506 is directly performed, and step 505 is no longer performed.

In this embodiment of this disclosure, when the first channel and the second channel form the relationship of the DBAC mode, the relationship between the first channel and the second channel is preferably adjusted to the relationship of the DBDC mode in the inter-band inter-channel mode. When the relationship between the first channel and the second channel cannot be adjusted to the relationship of the DBDC mode in the inter-band inter-channel mode, the relationship between the first channel and the second channel is adjusted to the relationship of the intra-band co-channel mode only when it is allowed. When it is not allowed, no processing is performed, and a current status is maintained. Alternatively, when the relationship between the first channel and the second channel cannot be adjusted to the relationship of the DBDC mode in the inter-band inter-channel mode, no processing is performed, and a current status is maintained.

In a possible implementation, after step 501, step 502 is no longer performed, but step 505 is directly performed, and then step 506 or step 507 is performed based on a result in step 505. That is, the first antenna in the mobile device 100 wirelessly communicates with the electronic device 200 in the Wi-Fi P2P connection manner through the first channel, the second antenna in the mobile device 100 wirelessly communicates with the first wireless signal source in the Wi-Fi AP connection manner through the second channel, and the mobile device 100 determines that the first channel and the second channel are in the intra-band inter-channel relationship, where the Wi-Fi chip in the mobile device 100 enables the first antenna in the mobile device 100 and the second antenna in the mobile device 100 to simultaneously, respectively, and independently send signals through different channels on two different frequency bands. Then, after the wireless signal source whose channel is the same as the first channel is detected within the other preset duration, the first antenna in the mobile device 100 wirelessly communicates with the electronic device 200 in the Wi-Fi P2P connection manner through the first channel, and the second antenna in the mobile device 100 wirelessly communicates with the wireless signal source in the Wi-Fi AP connection manner through the first channel. After the wireless signal source whose channel is the same as the first channel is not detected within the other preset duration, no processing is performed, and a current status is maintained.

Optionally, after step 501, a variant of step 505 may alternatively be directly performed, and a variant of step 506 or step 507 is performed based on an execution result of the variant of step 505. That is, the first antenna in the mobile device 100 wirelessly communicates with the electronic device 200 in the Wi-Fi P2P connection manner through the first channel, the second antenna in the mobile device 100 wirelessly communicates with the first wireless signal source in the Wi-Fi AP connection manner through the second channel, and the mobile device 100 determines that the first channel and the second channel are in the intra-band inter-channel relationship, where the Wi-Fi chip in the mobile device 100 enables the first antenna in the mobile device 100 and the second antenna in the mobile device 100 to simultaneously, respectively, and independently send signals through different channels on two different frequency bands. Then, after the wireless signal source whose channel is the same as the first channel is detected within the other preset duration, the first antenna in the mobile device 100 wirelessly communicates with the electronic device 200 in the Wi-Fi P2P connection manner through the second channel, and the second antenna in the mobile device 100 wirelessly communicates with the wireless signal source in the Wi-Fi AP connection manner through the second channel. After the wireless signal source whose channel is the same as the first channel is not detected within the other preset duration, no processing is performed, and a current status is maintained.

It should be noted that in the foregoing example in Embodiment 1, the first channel used for screen projection is kept unchanged, and the second channel used for internet access is adjusted, so that the relationship between the second channel and the first channel is adjusted from the intra-band inter-channel relationship to the inter-band inter-channel relationship or the intra-band co-channel relationship.

However, in another implementation, the second channel used for internet access may be kept unchanged, and the first channel used for screen projection may be adjusted. Similarly, the relationship between the second channel and the first channel may be adjusted from the intra-band inter-channel relationship to the inter-band inter-channel relationship or the intra-band co-channel relationship. The another implementation relates to FIG. 6D, FIG. 6E(A), and FIG. 6E(B). FIG. 6D is a schematic diagram of result comparison of a channel adjustment method according to this embodiment of this disclosure. FIG. 6E(A) and FIG. 6E(B) are a schematic flowchart of a channel adjustment method according to this embodiment of this disclosure. Further description is provided below with reference to FIG. 6D, FIG. 6E(A), and FIG. 6E(B).

In the another implementation, step 501 and step 502 and step 505 to step 507 in FIG. 6E(A) and FIG. 6E(B) are respectively the same as step 501 and step 502 and step 505 to step 507 in FIG. 6C. Details are not described herein. In FIG. 6D, (a) is the same as (a) in FIG. 6A. Details are not described herein. As shown in FIG. 6E(A) and FIG. 6E(B), after step 502, if the mobile device supports the DBDC mode in the inter-band inter-channel mode, step 503' is performed.

Step 503': The mobile device sends a request message to the electronic device through the first channel, and receives a response message returned by the electronic device for the request message.

Specifically, the request message sent by the mobile device 100 to the electronic device 200 includes a first channel to be obtained through adjustment, in other words, the first channel used for wireless communication between the mobile device 100 and the electronic device 200 in the Wi-Fi P2P manner is to be adjusted to the first channel to be obtained through adjustment. The first channel to be obtained through adjustment and the second channel are different channels on different frequency bands. The request message is used to request to wirelessly communicate with the electronic device 200 in the Wi-Fi P2P manner through the first channel to be obtained through adjustment.

Specifically, the request message may be sent in a broadcast manner.

The response message is in response to the request message, and is used to indicate that the electronic device agrees or disagrees with the request message.

Step 504': The mobile device determines whether the response message is a positive response message, and performs step 505' if the response message is a positive response message, or performs step 503 if the response message is not a positive response message.

The positive response message is used to indicate that the electronic device 200 agrees to wirelessly communicate with the mobile device 100 in the Wi-Fi P2P manner through the first channel to be obtained through adjustment.

In an implementation, after step 504' is performed, if a result is no, step 504' is performed again. After a quantity of times of repeated determining reaches a predetermined quantity of times, step 503 is performed only if the result continues to be no.

Step 505': The mobile device adjusts the first channel to the first channel to be obtained through adjustment, the first antenna wirelessly communicates with the electronic device in the Wi-Fi P2P manner through the adjusted first channel, and the second antenna wirelessly communicates with the first wireless signal source in the Wi-Fi AP manner through the second channel.

Specifically, in response to the positive response message, the mobile device 100 adjusts the first channel to the first channel to be obtained through adjustment, the first antenna wirelessly communicates with the electronic device 200 in the Wi-Fi P2P manner through the adjusted first channel, and the second antenna wirelessly communicates with the first wireless signal source in the Wi-Fi AP manner through the second channel.

For example, as shown in (b) in FIG. 6D, the mobile device 100 adjusts the first channel 410 from a channel 149 on a 5 GHz frequency band to a channel 6 on a 2.4 GHZ frequency band. In this case, the first channel 410 and the second channel 420 of the mobile device 100 no longer form a relationship of an intra-band inter-channel mode, but form the relationship of the DBDC mode in the inter-band inter-channel mode. In this way, speeds of transmission on the first channel 410 and transmission on the second channel 420 are ensured, no time division scheduling is performed, and no frame freezing occurs during screen projection and internet access of a user due to a channel reason. In addition, interference between the first channel 410 and the second channel 420 is reduced, and therefore user experience is improved.

Step 503 to step 505 in FIG. 6E(A) and FIG. 6E(B) are the same as step 503 to step 505 in FIG. 6C. Details are not described herein.

Alternatively, step 505 may be replaced as follows: Determine whether a wireless signal source whose channel is the same as the second channel is detected within other preset duration. If the wireless signal source whose channel is the same as the second channel is detected within the other preset duration, step 506 is performed. If the wireless signal source whose channel is the same as the second channel is not detected within the other preset duration, step 507 is performed.

Accordingly, step 506 may be replaced as follows: The first antenna wirelessly communicates with the electronic device in the Wi-Fi P2P manner through the second channel, and the second antenna wirelessly communicates with the wireless signal source in the Wi-Fi AP manner through the second channel.

Correspondingly, the wireless signal source in step 505 may be the first wireless signal source or another wireless signal source.

In the another implementation, when the first channel and the second channel form the relationship of the DBAC mode, the first channel is preferably adjusted, so that the relationship between the first channel and the second channel is adjusted to the relationship of the DBDC mode in the inter-band inter-channel mode. When the first channel cannot be adjusted, the second channel is preferably adjusted, so that the relationship between the first channel and the second channel is adjusted to the relationship of the DBDC mode in the inter-band inter-channel mode. When the relationship between the first channel and the second channel cannot be adjusted to the relationship of the DBDC mode in the inter-band inter-channel mode, the relationship between the first channel and the second channel is adjusted to a relationship of an intra-band co-channel mode when it is allowed. When it is not allowed, no processing is performed, and a current status is maintained. In this way, for the mobile device, extra overheads caused due to time division scheduling and channel switching can be avoided. Therefore, a problem that there is a delay in data packet transmission and packet loss can be alleviated to some extent.

A reason why a priority of the inter-band inter-channel mode is higher than that of the intra-band co-channel mode is that a network delay in the inter-band inter-channel mode is less than that in the intra-band co-channel mode, and a throughput in the intra-band co-channel mode on the high frequency band is greater than that in the inter-band inter-channel mode on the high frequency band. Based on current analysis of a historical data stream of the mobile device within specified duration, the mobile device needs to perform screen projection, and therefore a side of the mobile device has a relatively high requirement on a network delay. Therefore, the relationship between the internet access channel and the screen projection channel on the side of the mobile device is preferably adjusted to the relationship of the inter-band inter-channel mode.

In a possible embodiment, in this disclosure, a manner of adjusting the internet access channel may be determined with reference to a screen projection manner (for example, a homologous screen projection manner or a heterogeneous screen projection manner). Specifically, if a screen projection type selected by the mobile device is the homologous screen projection manner (the homologous screen projection manner means that pictures on the mobile device and the electronic device are consistent), screen projection has a relatively high requirement on a delay, and the relationship between the second channel and the first channel may be preferably adjusted to the relationship of the inter-band inter-channel mode on the high frequency band. On the contrary, if a screen projection type selected by the mobile device is the heterogeneous screen projection manner (the heterogeneous screen projection manner means that pictures on the mobile device and the electronic device may be inconsistent), there is a low requirement on a delay and a relatively high requirement on a throughput, and the relationship between the second channel and the first channel may be preferably adjusted to the relationship of the intra-band co-channel mode on the high frequency band. Therefore, for different screen projection types, the mobile device may adjust the internet access channel between the mobile device and the access point by using a corresponding policy.

In another possible embodiment, in this disclosure, a manner of adjusting the internet access channel may be determined with reference to a service type of data transmitted between the mobile device and the access point in a screen projection process. For example, the transmitted data may be encoded data of a video service type, encoded data of a game service type, or encoded data of a text service type. Different service types impose different impact on a network transmission parameter. For example, the network transmission parameter may be a delay, transmission quality, a transmission rate, a packet loss rate, or the like. Therefore, the mobile device may adjust the internet access channel in a corresponding manner. If the service type has a relatively high requirement on a delay (for example, a combat instruction in a game application), the relationship between the second channel and the first channel may be preferably adjusted to the relationship of the inter-band inter-channel mode. On the contrary, if the service type has a low requirement on a delay (for example, a video data stream in a video application), the relationship between the second channel and the first channel may be preferably adjusted to the relationship of the intra-band co-channel mode on the high frequency band because there is a low requirement on the delay and a relatively high requirement on a throughput.

It should be noted that the mobile device and the electronic device in Embodiment 1 may be interchanged. Specifically, the electronic device and the mobile device in each step in Embodiment 1 may be interchanged.

Embodiment 2

Figure 7A:
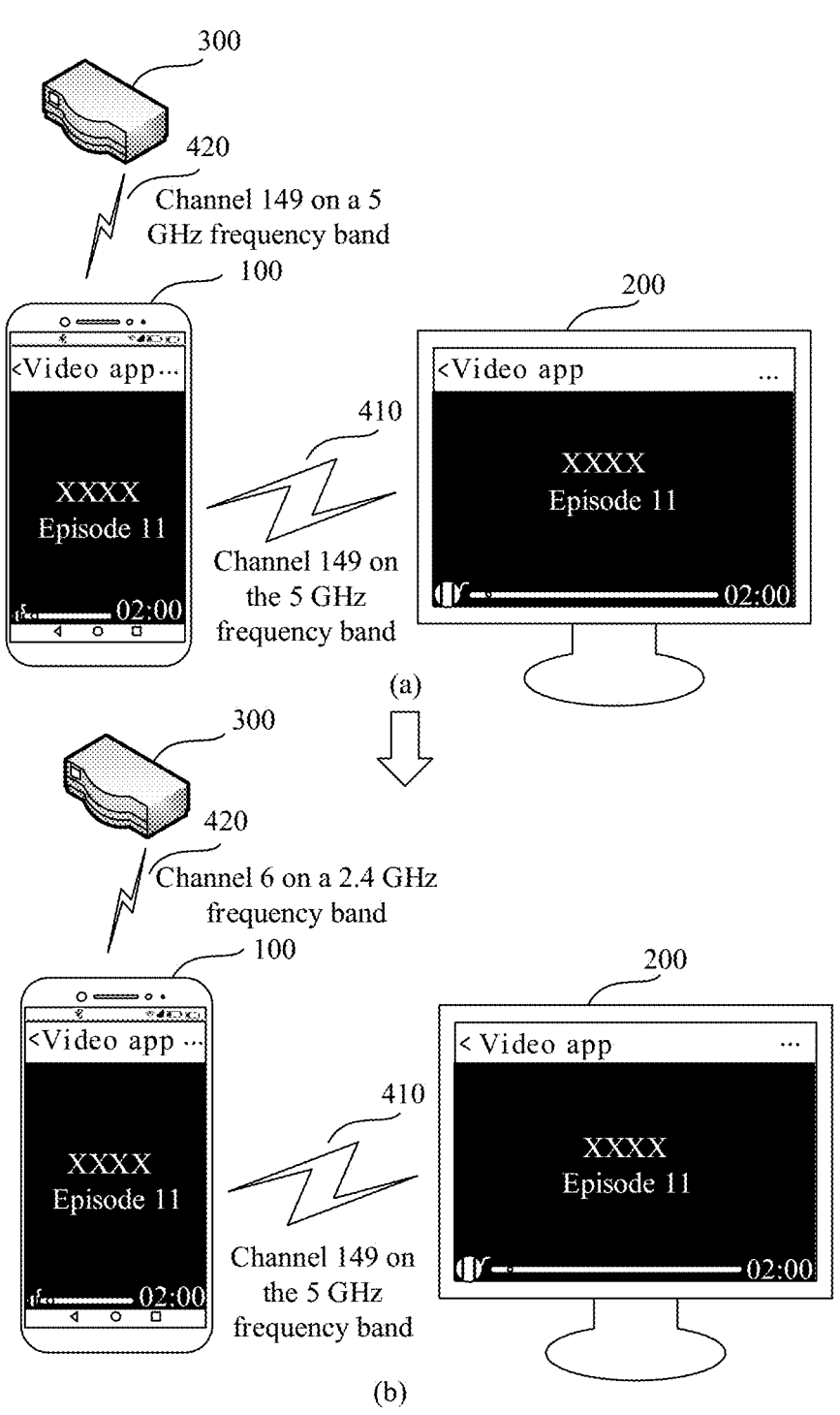
FIG. 7A is a schematic diagram of result comparison of a channel adjustment method according to an embodiment.

Embodiment 2 of this disclosure relates to FIG. 7A and FIG. 7B. As shown in (a) in FIG. 7A, a mobile device 100 wirelessly projects a screen onto an electronic device 200 through a first channel 410; and the mobile device 100 wirelessly communicates with a routing device 300 through a second channel 420. In this case, the mobile device 100 works in an intra-band co-channel mode. For clearer description, description is provided below by using an example in which the mobile device 100 performs internet access with the routing device 300 through the second channel. For example, the first channel 410 is a channel 149 on a 5 GHz frequency band, and the second channel is the channel 149 on the 5 GHZ frequency band. A relationship between the first channel and the second channel is a relationship of the intra-band co-channel mode. With reference to the foregoing priority relationship, in this embodiment, the relationship between the first channel and the second channel may be adjusted from the relationship of the intra-band co-channel mode to a relationship of a DBDC mode in an inter-band inter-channel mode.

A procedure of a channel adjustment method in Embodiment 2 is described below with reference to FIG. 7B. As shown in FIG. 7B, specific steps in the channel adjustment method are as follows:

Step 601: A first antenna in the mobile device 100 wirelessly communicates with the electronic device in a Wi-Fi P2P connection manner through the first channel, a second antenna in the mobile device 100 wirelessly communicates with a first wireless signal source of the routing device 300 in a Wi-Fi AP connection manner through the second channel, the mobile device 100 determines that the first channel and the second channel form an intra-band co-channel relationship, and the mobile device 100 determines that a Wi-Fi chip enables the first antenna in the mobile device 100 and the second antenna in the mobile device 100 to simultaneously, respectively, and independently send signals through different channels on two different frequency bands.

Specifically, the first antenna in the mobile device 100 may first wirelessly communicate with the electronic device 200 in the Wi-Fi P2P connection manner through the first channel, and then after the mobile device 100 receives a user operation, the second antenna in the mobile device 100 wirelessly communicates with the first wireless signal source of the routing device 300 in the Wi-Fi AP connection manner through the second channel. The first channel and the second channel form the intra-band co-channel relationship.

Alternatively, the second antenna in the mobile device 100 may first wirelessly communicate with the first wireless signal source of the routing device 300 in the Wi-Fi AP connection manner through the second channel, and then after a user operation is received, the first antenna in the mobile device 100 wirelessly communicates with the electronic device in the Wi-Fi P2P connection manner through the first channel. The first channel and the second channel form the intra-band co-channel relationship.

The user operation includes but is not limited to a touch operation or a voice input operation.

Optionally, before the mobile device 100 determines that the first channel and the second channel are in the intra-band co-channel relationship, for a manner in which the mobile device 100 obtains channel information of the first channel and channel information of the second channel, refer to step 501. Details are not described herein.

Step 602: Determine whether the mobile device 100 supports the DBDC mode in the inter-band inter-channel mode.

If the mobile device supports the DBDC mode in the inter-band inter-channel mode, step 603 is performed. If the mobile device does not support the DBDC mode in the inter-band inter-channel mode, step 605 is performed.

For example, the mobile device 100 determines whether the Wi-Fi chip in the mobile device 100 supports the DBDC mode in the inter-band inter-channel mode. If the mobile device determines that the Wi-Fi chip in the mobile device 100 supports the DBDC mode in the inter-band inter-channel mode, step 603 is performed. If the mobile device determines that the Wi-Fi chip in the mobile device 100 does not support the DBDC mode in the inter-band inter-channel mode, step 605 is performed.

Step 603: The mobile device 100 determines whether a second wireless signal source whose frequency band is different from a frequency band of the first wireless signal source is detected within preset duration.

Specifically, the mobile device determines, through scanning, whether the second wireless signal source whose frequency band is different from the frequency band of the first wireless signal source is detected within the preset duration. If the mobile device detects, through scanning within the preset duration, the second wireless signal source whose frequency band is different from the frequency band of the first wireless signal source, step 604 is performed. If the second wireless signal source whose frequency band is different from the frequency band of the first wireless signal source is not detected within the preset duration, step 605 is performed.

For a specific scanning manner, refer to step 503. Details are not described herein.

Step 604: The mobile device 100 adjusts the second channel, where an adjusted second channel and the first channel are different channels on different frequency bands, the second antenna in the mobile device 100 wirelessly communicates with the second wireless signal source in the Wi-Fi AP connection manner through the adjusted second channel, and the first antenna in the mobile device 100 still wirelessly communicates with the electronic device 200 in the Wi-Fi P2P connection manner through the first channel.

For example, as shown in (b) in FIG. 7A, the mobile device 100 adjusts the second channel 420) from the channel 149 on the 5 GHz frequency band to a channel 6 on a 2.4 GHZ frequency band. In this case, the first channel 410) and the second channel 420 of the mobile device 100 no longer form a relationship of an intra-band inter-channel mode, but form the relationship of the DBDC mode in the inter-band inter-channel mode. In this way, speeds of transmission on the first channel 410 and transmission on the second channel 420 are ensured, no time division scheduling is performed, and no frame freezing occurs during screen projection and internet access of a user due to a channel reason. In addition, interference between the first channel 410) and the second channel 420 is reduced, and therefore user experience is improved.

Step 605: The mobile device 100 performs no processing on the first channel and the second channel, and maintains a current status.

Optionally, the second channel used for communication between the mobile device and the first wireless signal source in the Wi-Fi AP manner may be kept unchanged, and the first channel used for communication between the mobile device and the electronic device in the Wi-Fi P2P manner may be adjusted. For corresponding steps, refer to step 503' to step 505', step 503, and step 504 in FIG. 6E(A) and FIG. 6E(B) and the corresponding implementation thereof. Details are not described herein.

In an implementation, the method may not include step 505, and in the foregoing procedure, step 506 may be directly performed at a position at which step 505 is involved. For example, after a determining result in step 502 is no, step 506 is directly performed, and step 505 is no longer performed.

In this embodiment of this disclosure, when the first channel and the second channel form the relationship of the intra-band co-channel mode, the relationship between the first channel and the second channel is preferably adjusted to the relationship of the DBDC mode in the inter-band inter-channel mode. In comparison with the intra-band co-channel mode, there is a lower network delay in the inter-band inter-channel mode. Therefore, a frame freezing problem existing during screen projection and internet access of a user can be effectively alleviated, and user experience can be improved.

It should be noted that in some possible implementations, after the mobile device 100 detects that the first channel and the second channel are two different channels on a same frequency band, and time division multiplexing is performed on the first antenna and the second antenna, or the first channel and the second channel are different channels on two different frequency bands, the first antenna wirelessly communicates with the another electronic device in the Wi-Fi P2P manner through the first channel, and the second antenna wirelessly communicates with the second wireless signal source in the Wi-Fi AP manner through the first channel.

Alternatively, after the mobile device 100 detects that the first channel and the second channel are two different channels on a same frequency band, and time division multiplexing is performed on the first antenna and the second antenna, or the first channel and the second channel are different channels on two different frequency bands, the first antenna wirelessly communicates with the electronic device in the Wi-Fi P2P manner through the second channel, and the second antenna wirelessly communicates with the second wireless signal source in the Wi-Fi AP manner through the second channel.

It should be noted that the mobile device and the electronic device in Embodiment 2 may be interchanged. Specifically, the mobile device and the electronic device in steps 601 to 605 in Embodiment 2 may be interchanged.

Embodiment 3

Figure 8A:
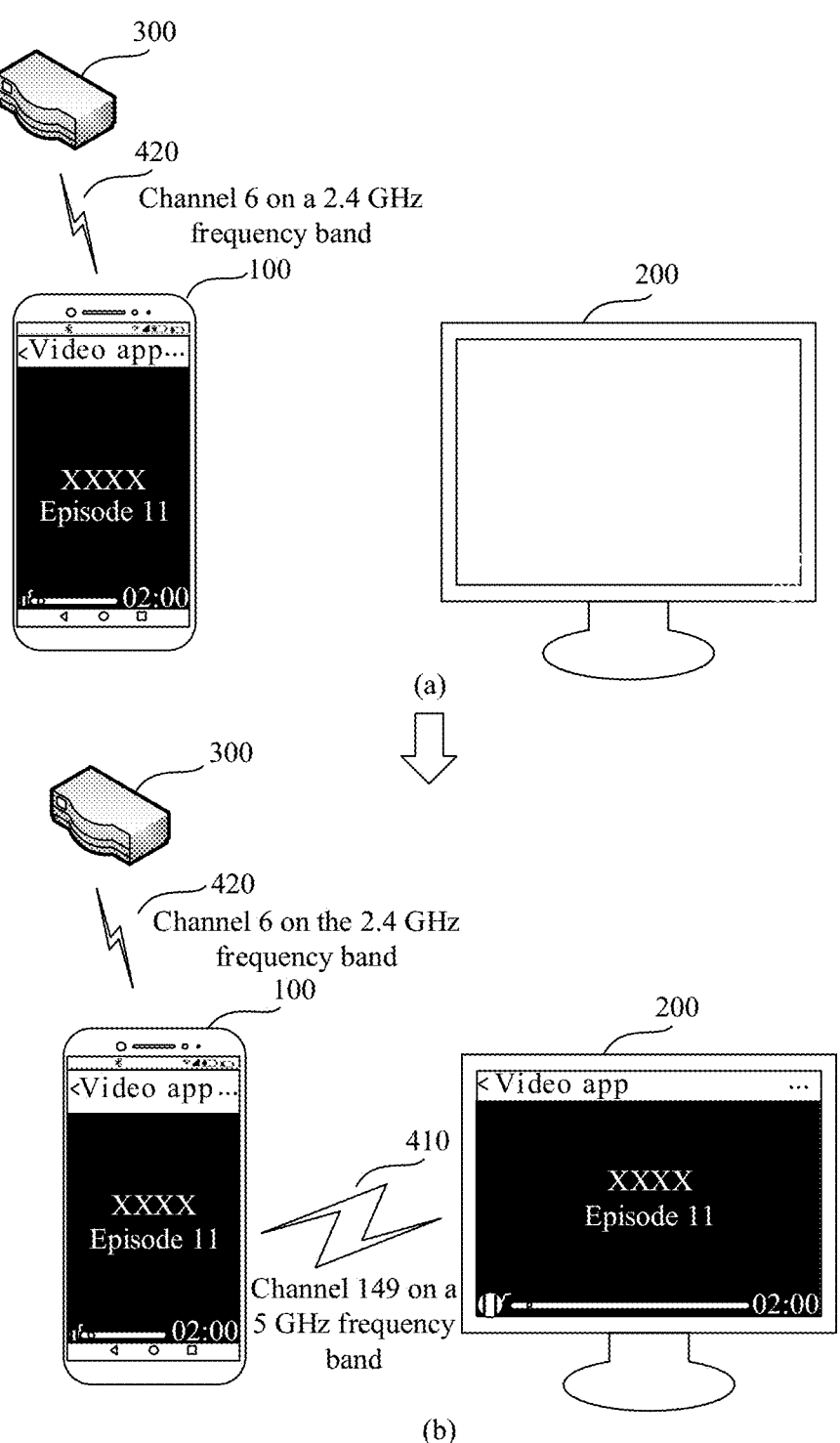
FIG. 8A and FIG. 8B are schematic diagrams of result comparison of a channel adjustment method according to an embodiment.
Figure 8B:
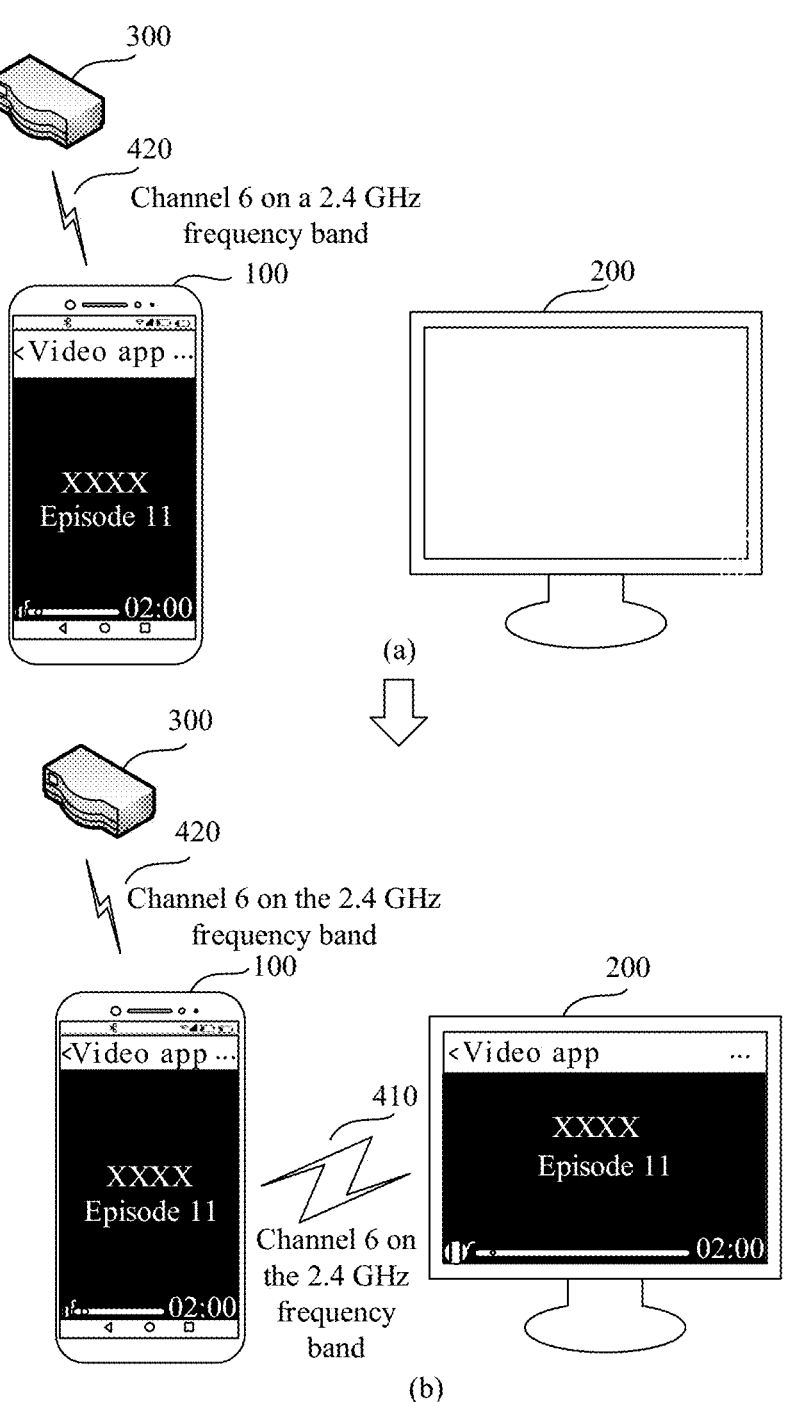

Embodiment 3 of this disclosure relates to FIG. 8A to FIG. 8C. A mobile device 100 wirelessly communicates with a routing device 300 in a Wi-Fi AP manner through a second channel. In this case, there is no wireless communication between the mobile device 100 and an electronic device 200. Then, when the mobile device 100 projects a screen onto the electronic device 200, a wireless communications channel between the mobile device 100 and the electronic device 200 is determined based on the second channel.

For clearer description, description is provided below by using an example in which the mobile device 100 performs internet access with the routing device 300 through the second channel. As shown in (a) in FIG. 8A, before the mobile device 100 projects a screen onto the electronic device 200, the mobile device 100 wirelessly communicates with the routing device 300 (for example, a routing device in a home or an office of a user) in the Wi-Fi AP manner through the second channel. Then, when the mobile device 100 establishes a Wi-Fi P2P connection to the electronic device 200, the mobile device 100 may determine, based on the second channel and information indicating whether a Wi-Fi chip in the mobile device 100 currently supports a DBDC mode, a first channel to be used for the Wi-Fi P2P network connection between the mobile phone 100 and the electronic device 200. In FIG. 8B. (a) is the same as (a) in FIG. 8A. Details are not described herein.

A procedure of a channel adjustment method in Embodiment 3 is described below with reference to FIG. 8C. As shown in FIG. 8C, specific steps in the channel adjustment method are as follows:

Step 801: The mobile device 100 establishes a Wi-Fi connection only to the routing device 300, which is specifically that a second antenna in the mobile device 100 wirelessly communicates with a first wireless signal source of the routing device 300 in a Wi-Fi AP connection manner through the second channel, and the mobile device 100 receives a user input, where the user input is used to indicate to establish a Wi-Fi P2P wireless communication connection between the mobile device 100 and the electronic device 200.

In this case, a first antenna in the mobile device is in an idle state.

For example, the user input may be a screen projection operation performed by the user. The screen projection operation is used to indicate to establish the Wi-Fi P2P wireless communication connection between the mobile device 100 and the electronic device 200.

The user input may be input through touch, by using a voice, or the like.

Step 802: Determine whether the mobile device 100 supports a DBDC mode in an inter-band inter-channel mode.

If the mobile device supports the DBDC mode in the inter-band inter-channel mode, step 803 is performed. If the mobile device does not support the DBDC mode in the inter-band inter-channel mode, step 804 is performed.

Step 803: The mobile device determines the first channel whose frequency band is different from a frequency band to which the second channel belongs, and then the first antenna wirelessly communicates with the electronic device in a Wi-Fi P2P manner through the first channel, and the second antenna wirelessly communicates with the first wireless signal source in the Wi-Fi AP manner through the second channel.

For example, as shown in (b) in FIG. 8A, the mobile device 100 determines that the first channel 410 is a channel 149 on a 5 GHz frequency band. Then, the first channel 410) and the second channel 420 of the mobile device 100 no longer form a relationship of an intra-band inter-channel mode, but form the relationship of the DBDC mode in the inter-band inter-channel mode. In this way, speeds of transmission on the first channel 410 and transmission on the second channel 420 are ensured, no time division scheduling is performed, and no frame freezing occurs during screen projection and internet access of a user due to a channel reason. In addition, interference between the first channel 410 and the second channel 420 is reduced, and therefore user experience is improved.

Step 804: The mobile device determines the first channel that is the same as the second channel, the first antenna in the mobile device wirelessly communicates with the electronic device in a Wi-Fi P2P connection manner through the first channel, and the second antenna still wirelessly communicates with the first wireless signal source in the Wi-Fi AP connection manner through the second channel.

After the mobile device determines the first channel that is the same as the second channel, the first channel is the same as the second channel. As shown in (b) in FIG. 8B, it is determined that the first channel 410 is a channel 6 on a 2.4 GHz frequency band. The first channel 410 and the second channel 420 in this case form a relationship of an intra-band co-channel mode.

Alternatively, in some implementations, step 804 may be replaced as follows: The mobile device determines that the first channel and the second channel are different channels on a same frequency band, the first antenna in the mobile device wirelessly communicates with the electronic device in a Wi-Fi P2P connection manner through the first channel, and the second antenna wirelessly communicates with the first wireless signal source in the Wi-Fi AP connection manner through the first channel.

In this embodiment of this disclosure, when the second channel already exists and the first channel is not established, the first channel may be preferably constructed as a channel that is in the relationship of the DBDC mode in the inter-band inter-channel mode with the second channel. When the first channel cannot be constructed as a channel that is in the relationship of the DBDC mode in the inter-band inter-channel mode with the second channel, the first channel is constructed as a channel that is in the relationship of the intra-band co-channel mode or the relationship of the intra-band inter-channel mode with the second channel.

When the first channel is preferably constructed as a channel that is in the relationship of the DBDC mode in the inter-band inter-channel mode with the second channel, the second channel may be kept unchanged, and then the first channel may be constructed; the second channel may be changed, and then the first channel may be constructed: or during construction, an attempt may be first made to keep the second channel unchanged, and then the first channel may be constructed, and if a predetermined quantity of failures is reached, the second channel is changed, and then the first channel is constructed.

It should be noted that in Embodiment 3, description is provided on the basis that the mobile device 100 already wirelessly communicates with the routing device 300 through the second channel before the mobile device 100 projects a screen. In some other implementations, before a screen is projected onto the electronic device 200, the electronic device 200 is wirelessly and communicatively connected only to the routing device 300. For example, the electronic device 200 performs internet access by using the routing device 300. Then, the mobile device 100 receives a user input. The user input is used to indicate the mobile device 100 to establish a Wi-Fi P2P wireless communication connection to the electronic device 200. Then, the mobile device 100 sends a Wi-Fi P2P wireless communication connection request to the electronic device 200. After the electronic device 200 receives the Wi-Fi P2P wireless communication connection request, the electronic device 200 may obtain channel information to be used for wireless communication between the electronic device 200 and the routing device 300 in the Wi-Fi AP manner, then determine, in the manner in FIG. 8C and a manner the same as or similar to the manner in FIG. 8C, a channel to be used to establish the Wi-Fi P2P network connection between the electronic device 200 and the mobile device 100, and feed back the channel to the mobile device 100. Therefore, the first channel used for wireless communication between the mobile device 100 and the electronic device 200 in the Wi-Fi P2P manner is finally established. Details are not described herein.

Embodiment 4

Figure 9A:
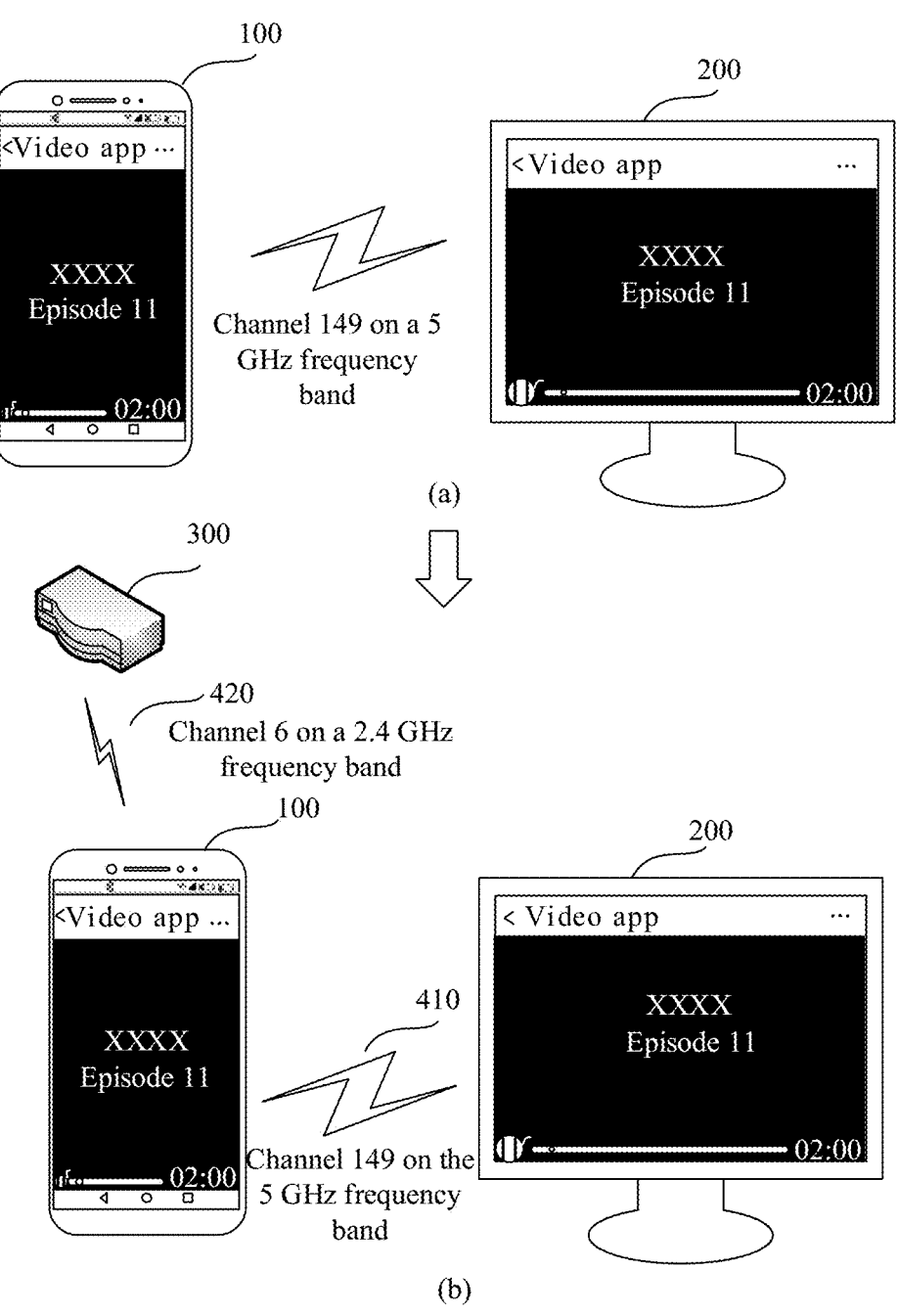
FIG. 9A and FIG. 9B are schematic diagrams of result comparison of a channel adjustment method according to an embodiment.
Figure 9B:
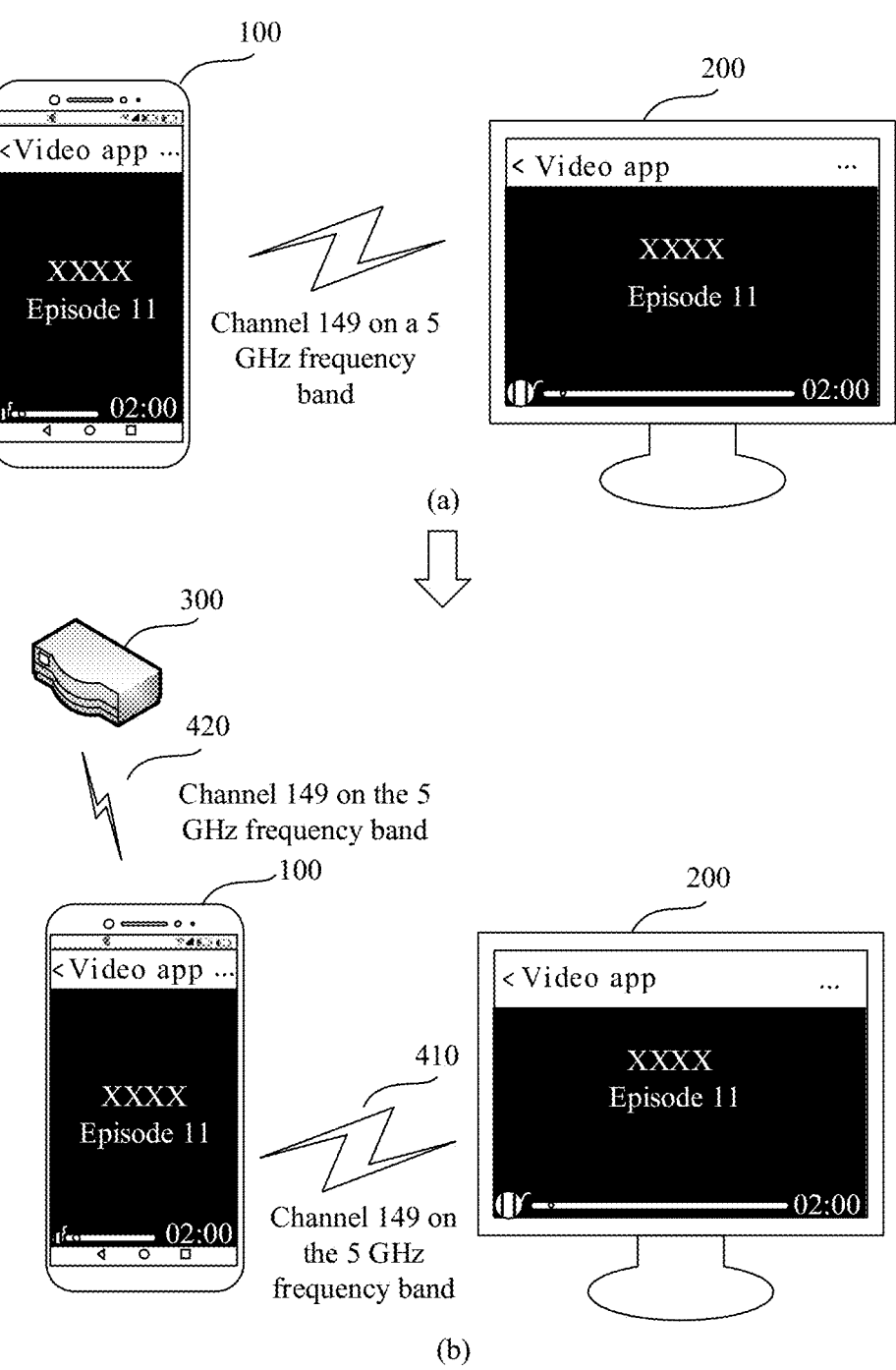

Embodiment 4 of this disclosure relates to FIG. 9A to FIG. 9C. A mobile device 100 wirelessly communicates with an electronic device 200 in a Wi-Fi P2P manner through a first channel. In this case, there is no wireless communication connection between the mobile device 100 and a routing device 300. Then, when the mobile device 100 initiates a wireless communication connection to the routing device 300, a wireless communications channel between the mobile device 100 and the routing device 300 is determined based on the first channel.

For clearer description, description is provided below by using an example in which the mobile device 100 projects a screen onto the electronic device 200 through the first channel. As shown in (a) in FIG. 9A, in a process of projecting, by the mobile device 100, a screen onto the electronic device 200, the mobile device 100 receives a user input. The user input is used to request to perform internet access by using the routing device 300 (for example, a routing device in a home or an office of a user). The mobile device 100 may determine, based on information indicating whether a Wi-Fi chip in the mobile device 100 currently supports a DBDC mode and the first channel, a second channel to be used for Wi-Fi AP wireless communication between the mobile device 100 and a first wireless signal source of the routing device 300. In FIG. 9B, (a) is the same as (a) in FIG. 9A. Details are not described herein.

A procedure of a channel adjustment method in Embodiment 4 is described below with reference to FIG. 9C. As shown in FIG. 9C, specific steps in the channel adjustment method are as follows:

Step 901: The mobile device establishes a Wi-Fi P2P connection only to the electronic device, which is specifically that a first antenna in the mobile device wirelessly communicates with the electronic device in a Wi-Fi P2P connection manner through the first channel, and the mobile device receives a user input, where the user input is used to indicate to establish a Wi-Fi AP wireless communication connection between the mobile device and the first wireless signal source of the routing device.

In an implementation, in this case, the mobile device establishes no Wi-Fi connection to any device other than the electronic device. In this case, a second antenna in the mobile device is in an idle state.

For example, the user input may be an internet access operation performed by the user. The internet access operation performed by the user is used to indicate to establish the Wi-Fi AP wireless communication connection between the mobile device 100 and the first wireless signal source of the routing device 300.

An input manner of the internet access operation performed by the user includes but is not limited to touch or voice input.

Step 902: Determine whether the mobile device supports a DBDC mode in an inter-band inter-channel mode.

If the mobile device 100 supports the DBDC mode in the inter-band inter-channel mode, step 903 is performed. If the mobile device does not support the DBDC mode in the inter-band inter-channel mode, step 904 is performed.

For example, the mobile device determines whether the Wi-Fi chip in the mobile device supports the DBDC mode in the inter-band inter-channel mode.

If the Wi-Fi chip in the mobile device 100 supports the DBDC mode in the inter-band inter-channel mode, step 903 is performed. If the Wi-Fi chip in the mobile device does not support the DBDC mode in the inter-band inter-channel mode, step 904 is performed.

Step 903: The mobile device determines the second channel whose frequency band is different from a frequency band to which the first channel belongs, and then the first antenna still wirelessly communicates with the electronic device in the Wi-Fi P2P manner through the first channel, and the second antenna wirelessly communicates with the first wireless signal source in a Wi-Fi AP manner through the second channel.

For example, as shown in (b) in FIG. 9A, the mobile device 100 determines that the second channel 420 is a channel 6 on a 2.4 GHz frequency band. Then, the second channel 420 and the first channel 410 of the mobile device 100 no longer form a relationship of an intra-band inter-channel mode, but form the relationship of the DBDC mode in the inter-band inter-channel mode. In this way, speeds of transmission on the first channel 410 and transmission on the second channel 420 are ensured, no time division scheduling is performed, and no frame freezing occurs during screen projection and internet access of a user due to a channel reason. In addition, interference between the first channel 410 and the second channel 420 is reduced, and therefore user experience is improved.

Step 904: The mobile device determines the second channel that is the same as the first channel, the first antenna in the mobile device wirelessly communicates with the electronic device in the Wi-Fi P2P connection manner through the first channel, and the second antenna wirelessly communicates with the first wireless signal source in a Wi-Fi AP connection manner through the second channel.

After the mobile device determines the second channel that is the same as the first channel, the second channel is the same as the first channel. As shown in (b) in FIG. 9B, the mobile device 100 determines that the second channel 420 is a channel 149 on a 5 GHZ frequency band, in other words, the second channel is the same as the first channel. The first channel 410 and the second channel 420 in this case form a relationship of an intra-band co-channel mode.

Alternatively, in some implementations, step 904 may be replaced as follows: The mobile device determines that the second channel is a channel that is in a relationship of being a different channel on a same frequency band as the first channel, the first antenna in the mobile device wirelessly communicates with the electronic device in the Wi-Fi P2P connection manner through the first channel, and the second antenna wirelessly communicates with the first wireless signal source in a Wi-Fi AP connection manner through the second channel.

In this embodiment of this disclosure, when the first channel already exists and the second channel is not established, the second channel may be preferably constructed as a channel that is in the relationship of the DBDC mode in the inter-band inter-channel mode with the first channel. When the second channel cannot be constructed as a channel that is in the relationship of the DBDC mode in the inter-band inter-channel mode with the first channel, the second channel is constructed as a channel that is in the relationship of the intra-band co-channel mode or the relationship of the intra-band inter-channel mode with the first channel.

When the second channel is preferably constructed as a channel that is in the relationship of the DBDC mode in the inter-band inter-channel mode with the first channel, the first channel may be kept unchanged, and then the second channel may be constructed; the first channel may be changed, and then the second channel may be constructed: or during construction, an attempt may be first made to keep the first channel unchanged, and then the second channel may be constructed, and if there is a failure, the first channel is changed, and then the second channel is constructed.

It should be noted that in Embodiment 4, description is provided on the basis that the mobile device 100 already wirelessly communicates with the electronic device 200 through the first channel before the mobile device 100 performs internet access. In some possible implementations, before the electronic device 200 performs internet access, a screen may be currently projected onto the electronic device 200 by the mobile device 100. In this case, the electronic device 200 obtains channel information used for wireless communication between the electronic device 200 and the mobile device 100 in the Wi-Fi P2P manner, and then the electronic device 200 determines, based on the channel information and in the manner in FIG. 9C and a manner the same as or similar to the manner in FIG. 9C, a channel to be used for the Wi-Fi AP network connection between the electronic device 200 and the routing device 300. Details are not described herein.

It should be noted that in Embodiment 1 to Embodiment 4, how the mobile device adjusts the first channel and/or the second channel, or establishes the first channel or the second channel is described by using an example in which the mobile device 100 needs to adjust the first channel and/or the second channel, or establish the first channel or the second channel. However, a person skilled in the art should understand that the manners of adjusting the first channel and/or the second channel and establishing the first channel or the second channel are also applicable to the electronic device 200.

That is, when the electronic device 200 wirelessly communicates with the routing device 300 in a Wi-Fi AP manner through a channel, and wirelessly communicates with the mobile device 100 in a Wi-Fi P2P manner through another channel: when the electronic device 200 wirelessly communicates only with the routing device 300 in a Wi-Fi AP manner through a channel, and does not wirelessly communicate with the mobile device 100 in a Wi-Fi P2P manner: or when the electronic device 200 wirelessly communicates only with the mobile device 100 in a Wi-Fi P2P manner through a channel, and does not wirelessly communicate with the routing device 300 in a Wi-Fi AP manner, the manners of adjusting the first channel and/or the second channel and establishing the first channel or the second channel included in Embodiment 1 to Embodiment 4 are also applicable to the electronic device 200. Preferably, the electronic device chooses to construct a relationship of an intra-band co-channel mode between the channel and the another channel. Certainly, the electronic device may alternatively choose to construct a relationship of a DBDC mode in an inter-band inter-channel mode or a relationship of an intra-band co-channel mode between the channel and the another channel.

Figure 10:
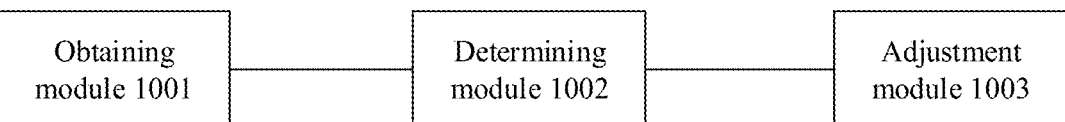
FIG. 10 is a schematic diagram of a structure of an apparatus according to an embodiment.

FIG. 10 is a schematic diagram of a structure of a channel adjustment apparatus according to an embodiment of this disclosure. As shown in FIG. 10, the apparatus includes an obtaining module 1001, a determining module 1002, and an adjustment module 1003.

The obtaining module 1001 is configured to obtain channel information. Specifically, the obtaining module 1001 may obtain channel information of a first channel and channel information of a second channel before the channel is adjusted. For details of the channel information of the first channel and the channel information of the second channel, refer to the foregoing embodiments.

The determining module 1002 is configured to determine whether a Wi-Fi chip enables a first antenna and a second antenna to simultaneously, respectively, and independently send signals through different channels on two different frequency bands.

The adjustment module 1003 is configured to adjust the first channel or the second channel. Specifically, after it is detected that the first channel and the second channel are two different channels on a same frequency band and time division multiplexing is performed on the first antenna and the second antenna, and a second wireless signal source whose frequency band is different from a frequency band of a first wireless signal source is detected within preset duration, the adjustment module 1003 may adjust the second channel. An adjusted second channel and the first channel are different channels on different frequency bands. Certainly: the adjustment module 1003 may adjust the first channel or the second channel in another case. For another case and a specific adjustment manner, refer to Embodiment 1 to Embodiment 4. Details are not described herein.

An embodiment of this disclosure further provides a computer storage medium. The computer storage medium stores computer instructions, and when the computer instructions are run on an electronic device, the electronic device is enabled to perform the related method steps to implement the methods in the foregoing embodiments.

An embodiment of this disclosure further provides a computer program product. When the computer program product is run on a computer, the computer is enabled to perform the related steps to implement the methods in the foregoing embodiments.

In addition, an embodiment of this disclosure further provides an apparatus. The apparatus may be specifically a chip system, a component, or a module. The apparatus may include a processor and a memory that are connected to each other. The memory is configured to store computer-executable instructions. When the apparatus runs, the processor may execute the computer-executable instructions stored in the memory, so that the apparatus performs the one or more steps in the foregoing embodiments to implement the methods in the foregoing embodiments.

In addition, an embodiment of this disclosure further provides an apparatus. The apparatus may be specifically a chip system, a component, or a module. The apparatus may include a processor and a memory that are connected to each other. The memory is configured to store computer-executable instructions. When the apparatus runs, the processor may execute the computer-executable instructions stored in the memory, so that the apparatus performs the methods in the foregoing method embodiments.

The electronic device, the computer storage medium, the computer program product, or the chip provided in the embodiments of this disclosure may be configured to perform the corresponding method provided above. Therefore, for beneficial effects that can be achieved by the electronic device, the computer storage medium, the computer program product, or the chip, refer to the beneficial effects of the corresponding method provided above. Details are not described herein.

The foregoing descriptions about implementations allow a person skilled in the art to clearly understand that, for the purpose of convenient and brief description, division of the foregoing functional modules is used as an example for illustration. In actual application, the foregoing functions can be allocated to different modules and implemented based on a requirement, that is, an inner structure of an apparatus is divided into different functional modules to implement all or some of the functions described above.

In the several embodiments provided in this disclosure, it should be understood that the disclosed apparatuses and methods may be implemented in other manners. For example, the described apparatus embodiment is merely an example. For example, division into modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this disclosure may be integrated into one processing unit, each of the units may exist alone physically, or two or more units may be integrated into one unit. The integrated unit may be implemented in a form of hardware, or may be implemented in a form of a software functional unit.

When the integrated unit is implemented in a form of a software functional unit and sold or used as an independent product, the integrated unit may be stored in a readable storage medium. Based on such an understanding, the technical solutions of embodiments of this disclosure essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of steps of methods in embodiments of this disclosure. The foregoing storage medium includes any medium that can store program code, such as a USB flash drive, a removable hard disk, a read-only memory (read-only memory, ROM), a random access memory (Random Access Memory, RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An electronic device, the electronic device comprising:
a Wi-Fi chip configured to enable a first antenna and a second antenna to simultaneously, respectively, and independently send signals through different channels on different frequency bands;
N antennas, N being a positive integer greater than or equal to 2, each being connected to the Wi-Fi chip, the N antennas comprising the first antenna and the second antenna, the first antenna being configured to wirelessly communicate with another electronic device in a wireless fidelity (Wi-Fi) peer-to-peer (P2P) manner through a first channel, and the second antenna being configured to wirelessly communicate with a first wireless signal source in a Wi-Fi access point (AP) manner through a second channel;
one or more processors; and
one or more memories having stored thereon one or more computer programs that, when executed by the one or more processors, cause the following to be performed:
after it is detected that the first channel and the second channel are two different channels on a same frequency band and time division multiplexing is performed on the first antenna and the second antenna, and a second wireless signal source whose frequency band is different from a frequency band of the first wireless signal source is detected within preset duration, the second channel is adjusted, wherein an adjusted second channel and the first channel are different channels on different frequency bands, and the first antenna wirelessly communicates with the another electronic device in the Wi-Fi P2P manner through the first channel, and the second antenna wirelessly communicates with the second wireless signal source in the Wi-Fi AP manner through the adjusted second channel.

2. The electronic device according to claim 1, wherein the one or more computer programs, when executed by the one or more processors, cause the following to be performed:
after it is detected that the first channel and the second channel are two different channels on the same frequency band, but the second wireless signal source whose frequency band is different from the frequency band of the first wireless signal source is not detected within the preset duration, the first antenna wirelessly communicates with the another electronic device in the Wi-Fi P2P manner through the first channel, and the second antenna wirelessly communicates with the first wireless signal source in the Wi-Fi AP manner through the first channel.

3. The electronic device according to claim 1, wherein the one or more computer programs, when executed by the one or more processors, cause the following to be performed:
after it is detected that the first channel and the second channel are two different channels on the same frequency band, but the second wireless signal source whose frequency band is different from the frequency band of the first wireless signal source is not detected within the preset duration, and a wireless signal source whose channel is the same as the first channel is detected within other preset duration, the first antenna wirelessly communicates with the another electronic device in the Wi-Fi P2P manner through the first channel, and the second antenna wirelessly communicates with the wireless signal source in the Wi-Fi AP manner through the first channel.

4. The electronic device according to claim 1, wherein the one or more computer programs, when executed by the one or more processors, cause the following to be performed:
after it is detected that the first channel and the second channel are two different channels on the same frequency band, but the second wireless signal source whose frequency band is different from the frequency band of the first wireless signal source is not detected within the preset duration, and the wireless signal source whose channel is the same as the first channel is not detected within the other preset duration, the electronic device skips processing.

5. The electronic device according to claim 1, wherein the one or more computer programs, when executed by the one or more processors, cause the following to be performed:
after it is detected that the first channel and the second channel are a same channel on the same frequency band, and the second wireless signal source whose frequency band is different from the frequency band of the first wireless signal source is detected within the preset duration, the second channel is adjusted, wherein an adjusted second channel and the first channel are different channels on different frequency bands, the first antenna wirelessly communicates with the another electronic device in the Wi-Fi P2P manner through the first channel, and the second antenna wirelessly communicates with the second wireless signal source in the Wi-Fi AP manner through the adjusted second channel.

6. An electronic device, wherein the electronic device comprises:

a Wi-Fi chip configured to enable a first antenna and a second antenna to simultaneously, respectively, and independently send signals through different channels on different frequency bands;

N antennas, N being a positive integer greater than or equal to 2, each being connected to the Wi-Fi chip, the N antennas comprising the first antenna and the second antenna, the first antenna being configured to wirelessly communicate with another electronic device in a wireless fidelity (Wi-Fi) peer-to-peer (P2P) manner through a first channel, the second antenna being configured to wirelessly communicate with a first wireless signal source in a Wi-Fi access point (AP) manner through a second channel; and one or more processors; and one or more memories having stored thereon one or more computer programs that, when executed by the one or more processors, cause the following to be performed:

after it is detected that the first channel and the second channel are two different channels on a same frequency band, and time division multiplexing is performed on the first antenna and the second antenna, or after it is detected that the first channel and the second channel are different channels on two different frequency bands, the first antenna wirelessly communicates with the another electronic device in the Wi-Fi P2P manner through the first channel, and the second antenna wirelessly communicates with the first wireless signal source in the Wi-Fi AP manner through the first channel; or after it is detected that the first channel and the second channel are two different channels on a same frequency band, and time division multiplexing is performed on the first antenna and the second antenna, or after it is detected that the first channel and the second channel are different channels on two different frequency bands, the first antenna wirelessly communicates with the another electronic device in the Wi-Fi P2P manner through the second channel, and the second antenna wirelessly communicates with the first wireless signal source in the Wi-Fi AP manner through the second channel.

* * * * *